(12) United States Patent  
Jang et al.

(10) Patent No.: US 12,487,788 B2
(45) Date of Patent: Dec. 2, 2025

(54) WEARABLE DISPLAY SYSTEM FOR IMPLEMENTING AUGMENTED REALITY

(71) Applicant: LG DISPLAY CO., LTD., Seoul (KR)

(72) Inventors: Kyung Jin Jang, Seongnam-si (KR); Jin Bong Chung, Seongnam-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 17/376,104

(22) Filed: Jul. 14, 2021

(65) Prior Publication Data

US 2022/0020302 A1 Jan. 20, 2022

(30) Foreign Application Priority Data

Jul. 16, 2020 (KR) .................... 10-2020-0088305

(51) Int. Cl.
| | | |
|---|---|---|
| *G06F 3/14* | (2006.01) | |
| *G02B 27/01* | (2006.01) | |
| *G09G 3/00* | (2006.01) | |
| *G09G 3/32* | (2016.01) | |

(Continued)

(52) U.S. Cl.
CPC ......... *G06F 3/1431* (2013.01); *G02B 27/017* (2013.01); *G02B 27/0172* (2013.01); *G06F 3/14* (2013.01); *G09G 3/001* (2013.01); *G09G 3/32* (2013.01); *G02B 2027/014* (2013.01); *G02B 2027/0178* (2013.01); *G06F 3/1454* (2013.01); *G06F 13/385* (2013.01); *G09G 5/14* (2013.01);

(Continued)

(58) Field of Classification Search
CPC .. G09G 3/001; G09G 3/32; G09G 2300/0814; G09G 2310/02; G09G 2330/021; G09G 5/14; G09G 2360/04; G02B 27/0172; G02B 27/017; G02B 2027/014; G02B 2027/0178; G06F 3/1431; G06F 3/14; G06F 3/1454; G06F 13/385
USPC ........................................................ 345/212
See application file for complete search history.

(56) References Cited

U.S. PATENT DOCUMENTS 5,657,034 A * 8/1997 Yamazaki ............ H04N 13/398
348/556
10,454,725 B1 * 10/2019 Lee ...................... H04L 25/4917
(Continued)

FOREIGN PATENT DOCUMENTS

| KR | 10-2016-0039389 A | 4/2016 |
| KR | 10-2017-0077546 A | 7/2017 |
| KR | 20190042644 A | 4/2019 |

OTHER PUBLICATIONS

Chinese Office Action dated Mar. 19, 2024 issued in Patent Application No. 202110805934.2 w/English Translation (14 pages).
(Continued)

*Primary Examiner* — Jason M Mandeville
(74) *Attorney, Agent, or Firm* — Fish & Richardson P.C.

(57) ABSTRACT

A wearable display system comprises a head mounted structure, a first display module mounted at one side of the head mounted structure to provide first content, a second display module mounted at the other side of the head mounted structure to provide second content, and an application processor connected to a first reception device of the first display module and a second reception device of the second display module via common transmission lanes, wherein the application processor transmits both the first content and the second content via the common transmission lanes.

18 Claims, 12 Drawing Sheets

(51) Int. Cl.
  *G06F 13/38* (2006.01)
  *G09G 5/14* (2006.01)
(52) U.S. Cl.
  CPC . *G09G 2300/0814* (2013.01); *G09G 2310/02* (2013.01); *G09G 2330/021* (2013.01)

(56) References Cited

U.S. PATENT DOCUMENTS

| | | | |
|---|---|---|---|
| 2006/0208993 A1* | 9/2006 | Jung | G06F 1/1647 345/98 |
| 2014/0055476 A1* | 2/2014 | Wang | G09G 5/18 345/547 |
| 2015/0043688 A1* | 2/2015 | Anastasov | H04L 7/00 375/354 |
| 2018/0053284 A1* | 2/2018 | Rodriguez | G06F 3/14 |
| 2021/0297293 A1* | 9/2021 | Lee | H04B 3/14 |

OTHER PUBLICATIONS

Office Action in Korean Appln. No. 10-2020-0088305, mailed on Feb. 26, 2025, 9 pages (with English translation).

* cited by examiner

FIG. 6
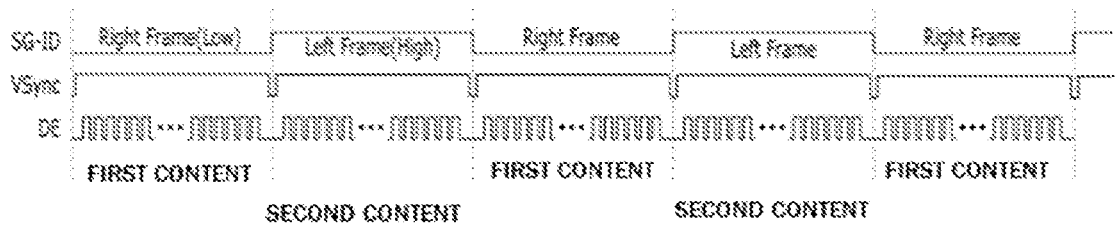
FIG. 7
| MD-ID | SG-ID | XNOR | |
|---|---|---|---|
| MD-ID1=0 | 0 | TE1=1, TE2=0 | MD1 (Right) Select |
| MD-ID1=0 | 1 | TE1=TE2=0 | No Operation |
| MD-ID2=1 | 0 | TE1=TE2=0 | No Operation |
| MD-ID2=1 | 1 | TE1=0, TE2=1 | MD2 (Left) Select |
FIG. 8
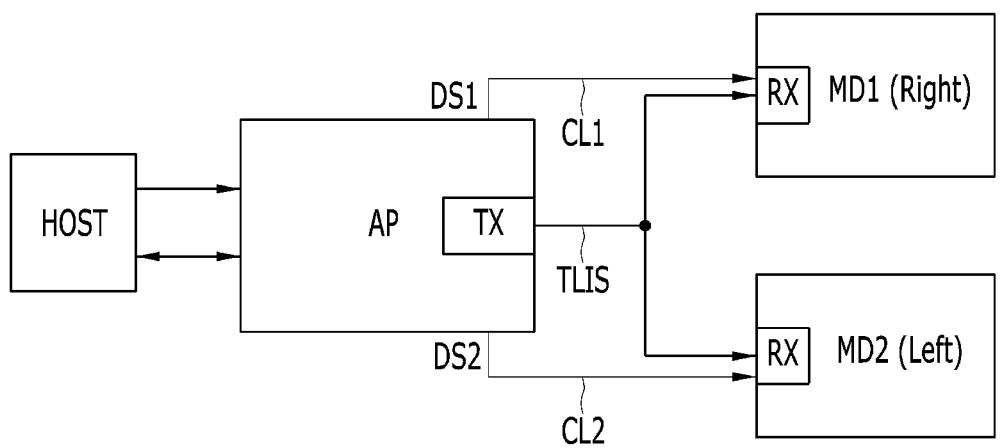

FIG. 10

| | Right Frame | Left Frame | Right Frame | Left Frame | Common Frame |
|---|---|---|---|---|---|
| DS1 | High | Low | High | Low | High |
| DS2 | Low | High | Low | High | High |
| VSync | ⊓ | ⊓ | ⊓ | ⊓ | ⊓ |
| DE | ⊓⊓⊓⊓⊓⊓···⊓⊓⊓⊓⊓⊓ | ⊓⊓⊓⊓⊓⊓···⊓⊓⊓⊓⊓⊓ | ⊓⊓⊓⊓⊓⊓···⊓⊓⊓⊓⊓⊓ | ⊓⊓⊓⊓⊓⊓···⊓⊓⊓⊓⊓⊓ | ⊓⊓⊓⊓⊓⊓···⊓⊓⊓⊓⊓⊓ |
| | FIRST CONTENT | SECOND CONTENT | FIRST CONTENT | SECOND CONTENT | THIRD CONTENT |

FIG. 11

| TRES2 | TRES1 | DS2 | DS1 | AND | |
|---|---|---|---|---|---|
| 0 | 0 | 0 | 0 | TE1=TE2=0 | No Operation |
| | | 0 | 1 | TE1=TE2=0 | |
| | | 1 | 0 | TE1=TE2=0 | |
| | | 1 | 1 | TE1=TE2=0 | |
| 0 | 1 | 0 | 0 | TE1=TE2=0 | No Operation |
| | | 0 | 1 | TE1=1,TE2=0 | MD1 Select |
| | | 1 | 0 | TE1=TE2=0 | No Operation |
| | | 1 | 1 | TE1=1,TE2=0 | MD1,MD2 Select |
| 1 | 0 | 0 | 0 | TE1=TE2=0 | No Operation |
| | | 0 | 1 | TE1=TE2=0 | No Operation |
| | | 1 | 0 | TE1=0,TE2=1 | MD2 Select |
| | | 1 | 1 | TE1=0,TE2=1 | MD1,MD2 Select |
| 1 | 1 | 0 | 0 | TE1=TE2=0 | No Operation |
| | | 0 | 1 | TE1=1,TE2=0 | MD1 Select |
| | | 1 | 0 | TE1=0,TE2=1 | MD2 Select |
| | | 1 | 1 | TE1=TE2=1 | Not Available |

WEARABLE DISPLAY SYSTEM FOR IMPLEMENTING AUGMENTED REALITY

CROSS-REFERENCE TO RELATED APPLICATION

This application claims the benefit of Korean Patent Application No. 10-2020-0088305, filed on Jul. 16, 2020, which is hereby incorporated by reference in its entirety as if fully set forth herein.

BACKGROUND

Field of the Disclosure

The present disclosure relates to a wearable display system for implementing augmented reality.

Description of the Background

Augmented reality, which is a field of virtual reality, has a different meaning than virtual reality. In virtual reality, a user is immersed in a virtual environment, whereby the user cannot see an actual environment. In augmented reality, on the other hand, the user can see an actual environment mixed with virtual objects, whereby better realism and additional information may be provided to the user. As described above, augmented reality is distinctive in that virtual objects overlap the real world, whereby the user can see the real world in an augmented state, and is characterized in that better realism than virtual reality is provided to the user.

A conventional wearable display system for implementing augmented reality includes two display modules configured to display augmented reality to both eyes (left and right eyes) of a user and an application processor connected to the display modules via an internal interface. The application processor transmits first object information to the first display module via first transmission lanes and transmits second object information to the second display module via second transmission lanes. The first transmission lanes and the second transmission lanes are independent of each other.

Since the conventional wearable display system for implementing augmented reality includes the first transmission lanes and the second transmission lanes, which are independent of each other, the number of transmission lanes is large, power consumption is high, and interface connection construction is complicated.

SUMMARY

Accordingly, the present disclosure is directed to a wearable display system for implementing augmented reality that substantially obviates one or more problems due to limitations and disadvantages of the related art.

The present disclosure also provides a wearable display system configured such that the number of transmission lanes and power consumption are reduced and interface connection construction is simplified in implementing augmented reality.

Additional advantages and features of the disclosure will be set forth in part in the description which follows and in part will become apparent to those having ordinary skill in the art upon examination of the following or may be learned from practice of the disclosure. The other advantages of the disclosure may be realized and attained by the structure particularly pointed out in the written description and claims hereof as well as the appended drawings.

To achieve these and other advantages and in accordance with the purpose of the disclosure, as embodied and broadly described herein, a wearable display system includes a head mounted structure, a first display module mounted at one side of the head mounted structure to provide first content, a second display module mounted at the other side of the head mounted structure to provide second content, and an application processor connected to a first reception device of the first display module and a second reception device of the second display module via common transmission lanes, wherein the application processor transmits both the first content and the second content via the common transmission lanes.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings:

FIG. 6 is a view showing first and second content signals transmitted in a state of being synchronized with one content identification signal;

FIG. 7 is a view showing a function table related to operation of FIG. 5;

FIGS. 8 and 9 are views showing interface connection construction between an application processor and display modules according to a second aspect of the present disclosure;

FIG. 10 is a view showing first to third content signals transmitted in a state of being synchronized with two content/module identification signals;

FIG. 11 is a view showing a function table related to operation of FIG. 9;

DETAILED DESCRIPTION

Figure 1:
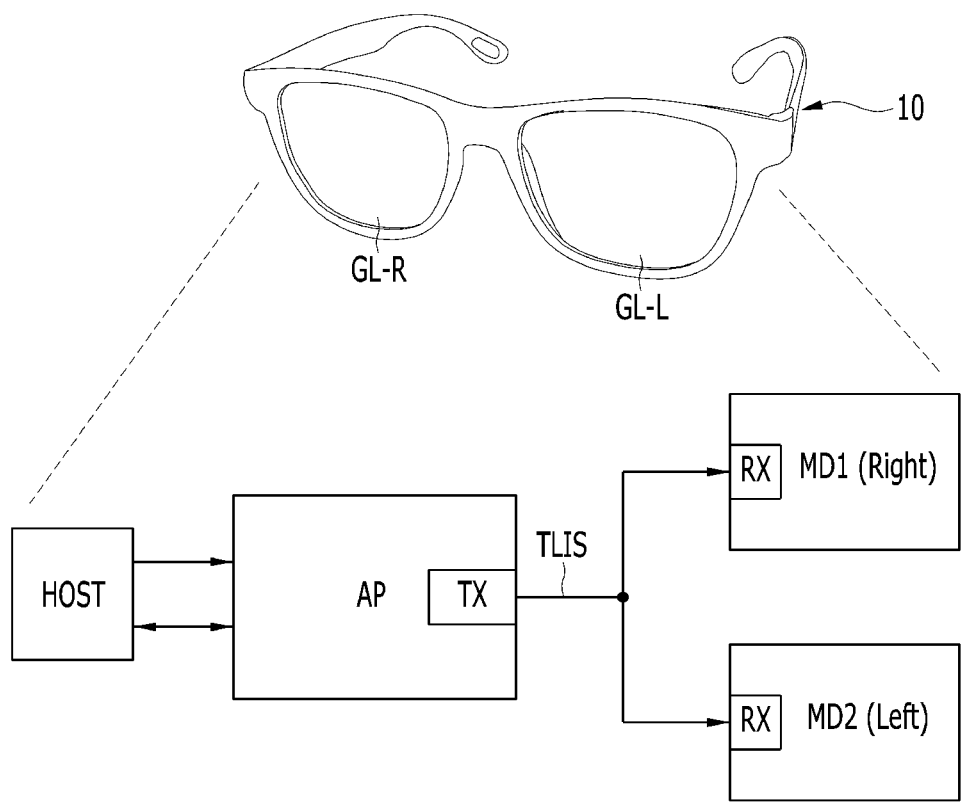
FIG. 1 is a block diagram showing a wearable display system according to an aspect of the present disclosure.

Advantages and features of the present disclosure and methods of achieving the same will be more clearly understood from aspects described below with reference to the accompanying drawings. However, the present disclosure is not limited to the following aspects and may be implemented in various different forms. The aspects are provided merely to complete the disclosure of the present disclosure and to fully inform a person having ordinary skill in the art to which the present disclosure pertains of the category of the disclosure. The disclosure is defined only by the category of the claims. Wherever possible, the same reference numbers will be used throughout the specification to refer to the same or like elements. In the drawings, the sizes of layers and regions may be exaggerated for clarity of description.

In the drawings for explaining the exemplary aspects of the present disclosure, for example, the illustrated shape, size, ratio, angle, and number are given by way of example, and thus, are not limitative of the disclosure of the present disclosure. Throughout the present specification, the same reference numerals designate the same constituent elements. In addition, in the following description of the present disclosure, a detailed description of known functions and configurations incorporated herein will be omitted when it may make the subject matter of the present disclosure rather unclear. The terms "comprises", "includes", and "has", used in this specification, do not preclude the presence or addition of other elements unless used along with the term "only." The singular forms are intended to include the plural forms as well, unless the context clearly indicates otherwise.

In the interpretation of constituent elements included in the various aspects of the present disclosure, the constituent elements are interpreted as including an error range even if there is no explicit description thereof.

In the description of the various aspects of the present disclosure, when describing positional relationships, for example, when the positional relationship between two parts is described using "on", "above", "below", "be side", or the like, one or more other parts may be located between the two parts unless the term "directly" or "closely" is used therewith.

In the description of the various aspects of the present disclosure, although terms such as, for example, "first" and "second" may be used to describe various elements, these terms are merely used to distinguish the same or similar elements from each other. Therefore, in the present specification, an element modified by "first" may be the same as an element modified by "second" within the technical scope of the present disclosure unless mentioned otherwise.

Hereinafter, aspects of the present disclosure will be described in detail with reference to the accompanying drawings. In the following description of the present disclosure, a detailed description of known functions and configurations incorporated herein will be omitted when it may make the subject matter of the present disclosure rather unclear.

FIG. 1 is a block diagram showing a wearable display system according to an aspect of the present disclosure.

The wearable display system according to the present disclosure, which is a display device that is put on a position near the face (or eyes) of a user, adopts interface technology of transmitting information generated using a computer to a visual system of the user. This interface technology may provide a highly realistic virtual presence to a user by transmitting virtual content formed using a computer to the user for their experience.

The wearable display system according to the present disclosure may commonly refer to a head mounted display (HMD); however, the present disclosure is not limited thereto. The wearable display system according to the present disclosure may be variously implemented by a face mounted display (FMD), an eye glasses-type display (EGD), or a near eye display (NED), which means a lightweight display system.

Referring to FIG. 1, the wearable display system according to the aspect of the present disclosure may be mounted to an EGD or NED type HMD structure 10. The HMD structure 10 may include a left-eye glass GL-L and a right-eye glass GL-R configured to provide an actual environment mixed with virtual content to a user.

The left-eye glass GL-L and the right-eye glass GL-R may be electrically and optically connected to the wearable display system such that the user experiences augmented reality. In order to implement augmented reality through the left-eye and right-eye glasses GL-L and GL-R, the wearable display system according to the present disclosure may include two display modules MD1 and MD2, an application processor AP connected to the display modules MD1 and MD2 via an inner interface, and a host system HOST configured to provide a content source to the application processor AP.

An optical path guide part, which may be implemented by a slit, may be further formed in the left-eye and right-eye glasses GL-L and GL-R. The optical path guide part may project light output from the display modules MD1 and MD2 onto at least some surfaces of the left-eye and right-eye glasses GL-L and GL-R, whereby content is displayed through optical see-through display. In the case in which an optical see-through display method is used at the HMD structure 10, it is possible to secure a wide viewing angle of 100 degrees or more, like a viewing angle range of humans.

The application processor AP drives an operating system (OS) and applications necessary to drive the wearable display system in order to control the display modules MD1 and MD2 and an interface. The application processor AP may be implemented in the form of a system-on-chip that is loaded with various chipset functions, including the function of a central processing unit (CPU), the function of a graphics processing unit (GPU), the function of a modem, the function of a video processing unit (VPU), the function of a digital signal processor (DSP), and the function of an image signal processor (ISP).

The host system HOST provides a content source to the application processor AP. The content source may include left-eye display information and right-eye display information. The host system HOST may be mounted to the HMD structure 10 together with the application processor AP in the form of a single chip. In addition, the host system HOST may be located independently of the HMD structure 10 and may be connected to the application processor AP via digital visual interface (DVI) or universal serial bus (USB).

The application processor AP is not connected to the display modules MD1 and MD2 via first transmission lanes and second transmission lanes, which are independent, but is connected to the display modules MD1 and MD2 via common transmission lanes TLIS. The number of interface transmission lanes that connect the application processor AP and the display modules MD1 and MD2 is reduced by almost half, compared to the conventional art. In the wearable display system according to this aspect, therefore, the number of transmission lanes and power consumption may be reduced and interface connection construction may be simplified in implementing augmented reality.

A transmission device TX of the application processor AP may be commonly connected to a reception device RX of the first display module MD1 and a reception device RX of the second display module MD2 via the common transmission lanes TLIS, and may transmit content information necessary for the display modules MD1 and MD2 in a low voltage differential signaling (LVDS) interface mode. The content information may be constituted as clock embedded data information, and may also be constituted as clock separable data information. The clock embedded data information may be used in a clock embedded interface mode, e.g. an external peripheral interface (EPI), a V-by-One interface (V×1), or a display port interface (DP). The clock separable data information may be used in an LVDS interface, a mini-LVDS interface, or a mobile industry processor interface (MIPI), in which clock and data are transmitted in a separated state.

The clock embedded interface mode and the clock separable interface mode may adopt a differential current driving mode, which is noise-robust and is for performing high-speed signal transmission. Hereinafter, a description will be given based on D-PHY of the mobile industry processor interface (MIPI), which is an example of the LVDS interface. However, it should be noted that technical idea of the present disclosure to reduce the number of transmission lanes is not limited as to the kind and shape of the interface.

D-PHY is used for display, is for performing high-speed communication, and has high cost efficiency. D-PHY performs basic functions of a general physical hierarchy (PHY). D-PHY may add Start of Packet (SoT)/End of Packet (EoT) indicating the start and the end of actual data, may convert parallel data into serial data for transmission, or may convert received serial data into parallel data. In addition, D-PHY may manage a clock system in order to transmit a clock signal for high-speed image data transmission.

The application processor AP is connected to the display modules MD1 and MD2 via the common transmission lanes TLIS in a multi-drop mode. The multi-drop mode, which is also called a multi-point mode, is a mode of connecting a plurality of display modules MD1 and MD2 to a common communication line TLIS. The multi-drop mode has a merit of high utility and low cost, since the transmission lanes TLIS are shared. Since the display modules MD1 and MD2 receive clock and data information in the multi-drop mode, an address determination function and a buffer storage device capable of temporarily storing data blocks may be needed. In the multi-drop mode, clock and data information may be transmitted by polling and selection.

In the case in which the content information is constituted as clock embedded data information, the common transmission lanes TLIS may include a positive data transmission lane and a negative data transmission lane for differential signaling. In this case, a positive clock transmission lane and a negative clock transmission lane for separate clock transmission may be omitted.

Meanwhile, in the case in which the content information is constituted as clock separable data information, the common transmission lanes TLIS may include a positive data transmission lane, a negative data transmission lane, a positive clock transmission lane, and a negative clock transmission lane for differential signaling.

Figure 2:
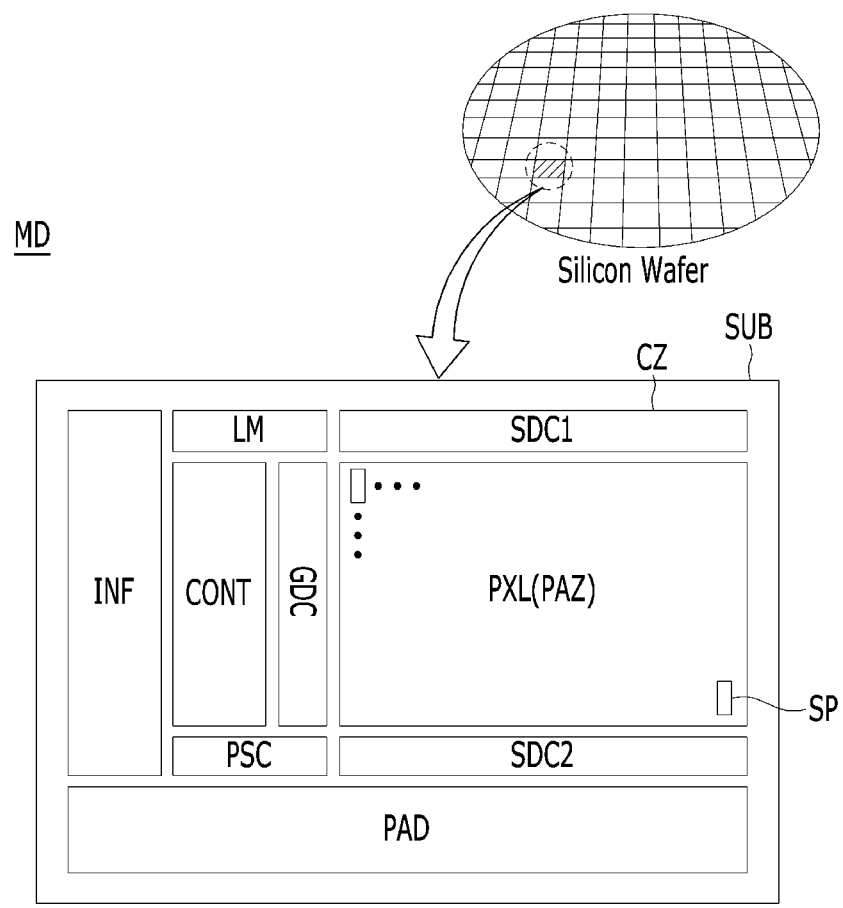
FIG. 2 is a view showing the construction of one display module of FIG. 1.

FIG. 2 is a view showing the construction of one display module of FIG. 1.

Referring to FIG. 2, the display module MD may be one of the display modules MD1 and MD2 of FIG. 1.

The display module MD may be a micro-display device having a structure suitable for application to electronic devices, such as a virtual reality device and an augmented reality device, or having excellent display performance. In this case, a pixel array PXL, source drive circuits SDC1 and SDC2, a gate drive circuit GDC, and a controller CONT may be formed on a substrate SUB together or separately. The substrate SUB may be implemented by a silicon substrate (or a silicon semiconductor substrate); however, the present disclosure is not limited thereto. In this specification, "micro" may mean that the size of the display device is small or may mean that, even though the size of the display device is not small, a manufacturing process is performed on a micro scale.

The display module MD may have a backplane structure in which the pixel array PXL and various drive circuits are formed on the substrate SUB. The substrate SUB may be of p-type or n-type. In this specification, "p" means holes, "n" means electrons.

The substrate SUB may include a pixel array zone PAZ, in which the pixel array PXL is disposed, and a circuit zone CZ, in which various drive circuits are disposed. The circuit zone CZ of the substrate SUB may be located around the pixel array zone PAZ of the substrate SUB. As an example, the circuit zone CZ may be located on at least one side of the pixel array zone PAZ or may be located so as to surround the contour of the pixel array zone PAZ.

On the pixel array PXL of the substrate SUB, a plurality of subpixels SP may be disposed and signal lines configured to supply various signals and voltage to the plurality of subpixels SP may be disposed. The signal lines may include data lines configured to transmit data voltage corresponding to a content signal and gate lines configured to transmit a scan signal (a gate signal). On the pixel array PXL, the data lines may be disposed so as to extend in a first direction, and the gate lines may be disposed so as to extend in a second direction different from the first direction. In addition, the signal lines disposed on the pixel array PXL may further include a drive voltage line configured to transmit high-potential drive voltage EVDD. Depending on circumstances, a sensing line configured to transmit reference voltage or to sense voltage may be further included. The signal lines disposed on the pixel array PXL may be electrically connected to the drive circuits disposed on the circuit zone CZ of the substrate SUB. In addition, low-potential drive voltage EVSS may be supplied to the pixel array PXL. Here, the low-potential drive voltage EVSS may be a kind of common voltage applied to all of the subpixels SP.

The drive circuits disposed on the circuit zone CZ of the substrate SUB may include at least one source drive circuit SDC1 and SDC2 configured to drive the data lines, at least one gate drive circuit GDC configured to drive the gate lines, and a controller CONT configured to control operation timing of the source drive circuits SDC1 and SDC2 and the gate drive circuit GDC.

The drive circuits disposed on the circuit zone CZ of the substrate SUB may further include at least one line memory LM configured to temporarily store image data (i.e. a content signal) output from the controller CONT and to output the stored image data to the source drive circuits SDC1 and SDC2 at predetermined timing. The line memory LM may be disposed inside or outside the source drive circuits SDC1 and SDC2. In the case in which the line memory LM is disposed inside or outside the source drive circuits SDC1 and SDC2, the line memory LM may be disposed between the controller CONT and the source drive circuits SDC1 and SDC2.

The drive circuits disposed on the circuit zone CZ of the substrate SUB may further include a power circuit PSC configured to generate various drive voltages necessary to drive the subpixels SP in the pixel array PXL. The power circuit PSC may include a power generator, such as a DC-DC converter, and may generate and output various drive voltages (e.g. DVDD, DVSS, VGH, and VGL)

required by the pixel array PXL from various source voltages supplied from the outside.

The drive circuits disposed on the circuit zone CZ of the substrate SUB may include an interface unit INF for signal input and output or communication with an external electronic device or electronic parts. The interface unit INF may be implemented in a mobile industry processor interface (MIPI) mode, wherein the mobile industry processor interface (MIPI) is a kind of low-voltage differential signaling (LVDS) interface; however, the present disclosure is not limited thereto. The interface unit INF may also be implemented in a serial peripheral interface (SPI) mode. The SPI mode, which is a synchronous communication mode in which synchronization with an external peripheral is performed through clock, has merits in that protocol is flexible, no transmitter is needed, and hardware interface processing is simple.

A pad unit PAD configured to electrically connect other electronic parts outside the substrate SUB to the drive circuits may be disposed on the circuit zone CZ of the substrate SUB. The pad unit PAD may be used for signal input and output, power supply, or communication. Although the pad unit PAD is shown as being disposed on only one side of the substrate SUB in FIG. 2, the pad unit PAD may be disposed at various positions in a dispersed state. In the case in which the pad unit PAD is disposed on the edge of the substrate SUB, however, design is easily performed in electrical connection with other electronic parts and disposition of the drive circuits.

Since not only the pixel array PXL but also the drive circuits, i.e. the source drive circuits SDC1 and SDC2, the gate drive circuit GDC, the controller CONT, and the power circuit PSC, are formed on the substrate SUB, it is possible to easily and rapidly manufacture the display module MD.

Meanwhile, the gate drive circuit GDC may be located on only one side of the pixel array PXL so as to drive the gate lines in a single feeding mode, or may be located on opposite sides of the pixel array PXL so as to drive the gate lines in a dual feeding mode. The source drive circuits SDC1 and SDC2 may be located on only one side of the pixel array PXL so as to drive all of the data lines, or may be located on opposite sides of the pixel array PXL so as to drive the data lines assigned thereto.

Since the entirety or a portion of the display module MD is formed through a wafer manufacturing process, it is possible to accurately and easily manufacture the display module MD. Since the display module MD is formed on the substrate in the form of an integrated circuit (IC), production yield of the display module MD is high and the manufacturing cost of the display module MD is reduced.

Figure 3:
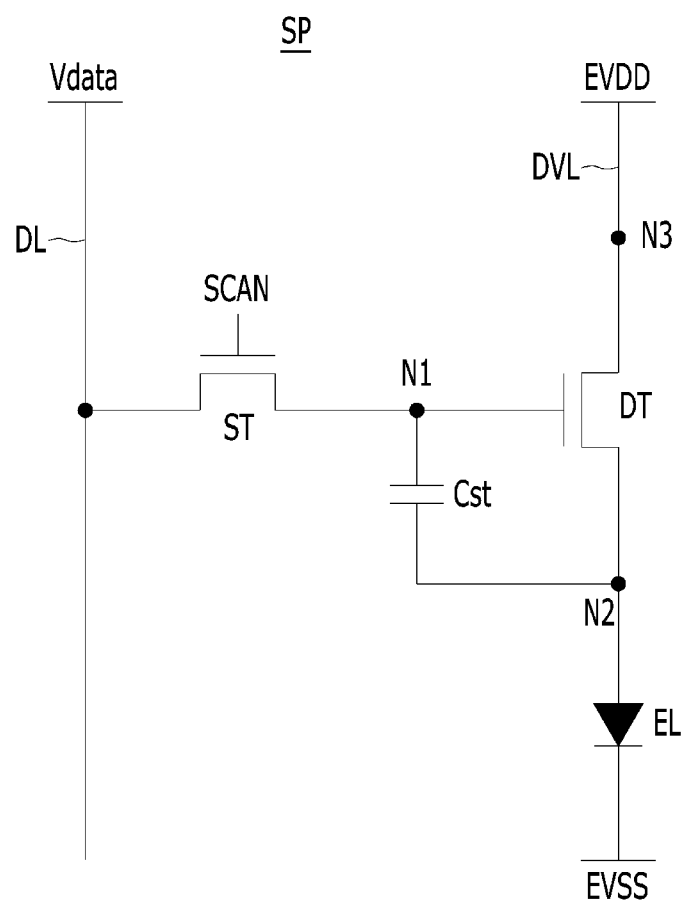
FIG. 3 is an equivalent circuit diagram of one subpixel of FIG. 2.

FIG. 3 is an equivalent circuit diagram of one subpixel of FIG. 2.

Referring to FIG. 3, the subpixel SP may include a light-emitting device EL, a drive device DT, a storage capacitor Cst, and a switch transistor ST. The drive device DT may be implemented by a drive transistor. In this aspect, each of the drive transistor DT and the switch transistor ST may be implemented by an n-type transistor or a p-type transistor.

The light-emitting device EL emits light based on pixel current. The light-emitting device EL includes an anode connected to a source node N2, a cathode connected to an input end of the low-potential drive voltage EVSS, and an organic or inorganic compound layer located between the anode and the cathode. The organic or inorganic compound layer includes a hole injection layer (HIL), a hole transport layer (HTL), an emission layer (EML), an electron transport layer (ETL), and an electron injection layer (EIL). When voltage applied to the anode becomes equal to or higher than quiescent point voltage, compared to the low-potential drive voltage EVSS applied to the cathode, the light-emitting device EL is turned on. When the light-emitting device EL is turned on, holes that have passed through the hole transport layer (HTL) and electrons that have passed through the electron transport layer (ETL) move to the emission layer (EML) to form excitons. As a result, the emission layer (EML) generates light.

The drive transistor DT includes a gate connected to a gate node N1, a source connected to a source node N2, and a drain connected to an input end of the high-potential drive voltage EVDD via a drive voltage line DVL. The drive transistor DT generates pixel current based on voltage between the gate and the source. The pixel current may be generated so as to have a magnitude proportional to the square of the voltage between the gate and the source.

The storage capacitor Cst is connected between the gate node N1 and the source node N2 to maintain the voltage between the gate and the source of the drive transistor DT.

The switch transistor ST connects a data line DL and the gate node N1 to each other according to a scan signal SCAN to apply data voltage Vdata charged in the data line DL to the gate node N1. The data voltage Vdata has a value corresponding to gradation. The voltage between the gate and the source of the drive transistor DT is proportional to the magnitude of the data voltage Vdata. In the case in which the data voltage Vdata increases, therefore, the pixel current may also increase. The switch transistor ST includes a gate connected to a gate line, a first electrode (one of a source and a drain) connected to the data line DL, and a second electrode (the other of the source and the drain) connected to the gate node N1.

The subpixel structure exemplarily shown in FIG. 3 is merely an example for convenience in description, and the subpixel structure may be variously changed depending on model and panel structure. As an example, the subpixel SP may further include at least one switch transistor necessary to sense drive characteristics (threshold voltage, electron mobility, etc.) of the drive transistor DT and/or the light-emitting device EL.

First Aspect

Figure 4:
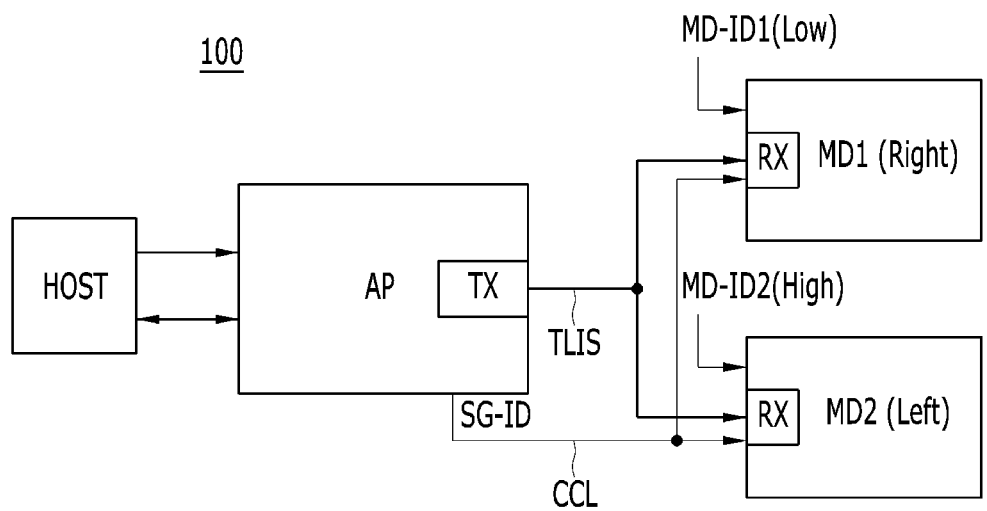
FIGS. 4 and 5 are views showing interface connection construction between an application processor and display modules according to a first aspect of the present disclosure.
Figure 5:
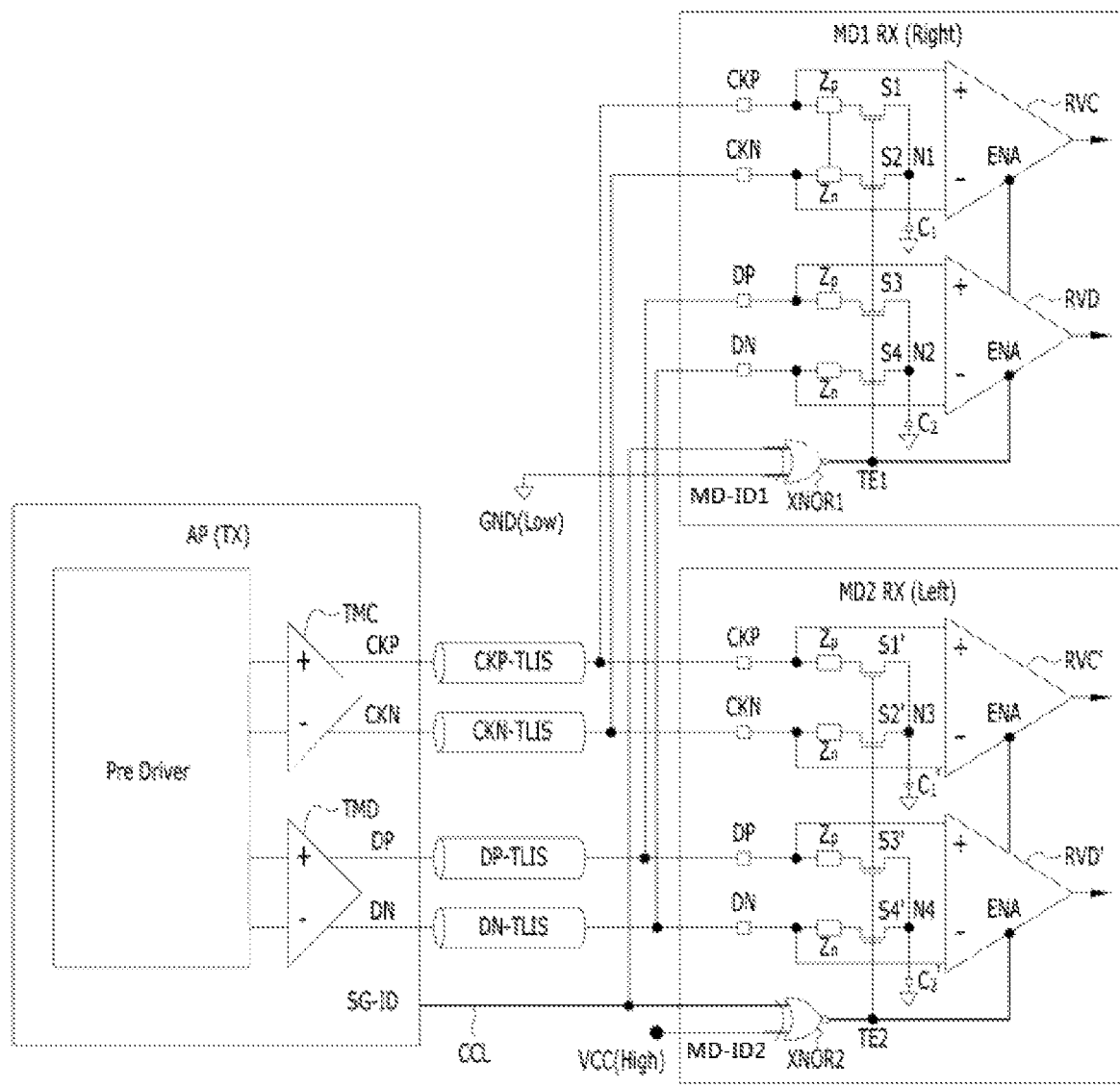

FIGS. 4 and 5 are views showing interface connection construction between an application processor and display modules according to a first aspect of the present disclosure. FIG. 6 is a view showing first and second content signals transmitted in a state of being synchronized with one content identification signal. FIG. 7 is a view showing a function table related to operation of FIG. 5.

Referring to FIGS. 4 and 5, the wearable display system 100 according to the first aspect of the present disclosure may include a first display module MD1, a second display module MD2, and an application processor AP.

The first display module MD1 may be mounted at one side of a head mounted structure to provide first content (e.g. right-eye content) to the right eye of a user. The second display module MD2 may be mounted at the other side of the head mounted structure to provide second content (e.g. left-eye content) to the left eye of the user. The application processor AP is connected to a first reception device MD1 RX of the first display module MD1 and to a second reception device MD2 RX of the second display module MD2 via common transmission lanes TLIS. The application processor AP is also mounted to the head mounted structure.

The application processor AP transmits the first content to the first reception device MD1 RX and transmits the second content to the second reception device MD2 RX via the common transmission lanes TLIS in a multi-drop mode, whereby the number of transmission lanes and power consumption may be reduced and interface connection construction may be simplified in implementing augmented reality.

The wearable display system 100 according to the first aspect of the present disclosure may adopt a clock separable interface mode. In this case, the common transmission lanes TLIS include a positive data transmission lane DP-TLIS and a negative data transmission lane DN-TLIS for differential signaling. In addition, the common transmission lanes TLIS include a positive clock transmission lane CKP-TLIS and a negative clock transmission lane CKN-TLIS for differential signaling.

In the case in which the clock separable interface mode is adopted, a transmission device AP TX of the application processor AP and the first and second reception devices MD1 RX and MD2 RX may be implemented as shown in FIG. 5.

Specifically, the transmission device AP TX of the application processor AP includes a pre-drive unit configured to serialize clock and data to be transmitted into a differential type, a first transmitter TMC configured to output the clock processed into the differential serial type to the positive clock transmission lane CKP-TLIS and the negative clock transmission lane CKN-TLIS, and a second transmitter TMD configured to output the data processed into the differential serial type to the positive data transmission lane DP-TLIS and the negative data transmission lane DN-TLIS.

The first reception device MD1 RX has a first receiver RVC having a first positive clock input terminal CKP (+) connected to the positive clock transmission lane CKP-TLIS and a first negative clock input terminal CKN (−) connected to the negative clock transmission lane CKN-TLIS. In addition, the first reception device MD1 RX has a second receiver RVD having a second positive data input terminal DP (+) connected to the positive data transmission lane DP-TLIS and a second negative data input terminal DN (−) connected to the negative data transmission lane DN-TLIS. In addition, the first reception device MD1 RX includes a first termination resistor Zp and a first termination switch S1 connected in series between the first positive clock input terminal CKP (+) and a first node N1, a second termination resistor Zn and a second termination switch S2 connected in series between the first negative clock input terminal CKN (−) and the first node N1, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, a first termination capacitor C1 connected between the first node N1 and ground voltage, and a second termination capacitor C2 connected between the second node N2 and the ground voltage.

The second reception device MD2 RX has a third receiver RVC' having a third positive clock input terminal CKP (+) connected to the positive clock transmission lane CKP-TLIS and a third negative clock input terminal CKN (−) connected to the negative clock transmission lane CKN-TLIS. In addition, the second reception device MD2 RX has a fourth receiver RVD' having a fourth positive data input terminal DP (+) connected to the positive data transmission lane DP-TLIS and a fourth negative data input terminal DN (−) connected to the negative data transmission lane DN-TLIS.

In addition, the second reception device MD2 RX includes a fifth termination resistor Zp and a fifth termination switch S1' connected in series between the third positive clock input terminal CKP (+) and a third node N3, a sixth termination resistor Zn and a sixth termination switch S2' connected in series between the third negative clock input terminal CKN (−) and the third node N3, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, a third termination capacitor C1' connected between the third node N3 and ground voltage, and a fourth termination capacitor C2' connected between the fourth node N4 and the ground voltage.

Meanwhile, the wearable display system 100 according to the first aspect may adopt a clock embedded interface mode. In this case, the common transmission lanes TLIS include a positive data transmission lane DP-TLIS and a negative data transmission lane DN-TLIS for differential signaling.

In the case in which the clock embedded interface mode is adopted, the first transmitter TMC of the transmission device AP TX of the application processor AP, the positive clock transmission lane CKP-TLIS, the negative clock transmission lane CKN-TLIS, the first receiver RVC of the first reception device MD1 RX, the third receiver RVC' of the second reception device MD2 RX, the first termination resistor Zp, the first termination switch S1, the second termination resistor Zn, the second termination switch S2, the fifth termination resistor Zp, the fifth termination switch S1', the sixth termination resistor Zn, and the sixth termination switch S2' may be omitted from FIG. 5.

In other words, the first reception device MD1 RX may include a second receiver RVD having a second positive data input terminal DP (+) connected to the positive data transmission lane DP-TLIS and a second negative data input terminal DN (−) connected to the negative data transmission lane DN-TLIS, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, and a second termination capacitor C2 connected between the second node N2 and ground voltage.

In addition, the second reception device MD2 RX may include a fourth receiver RVD' having a fourth positive data input terminal DP (+) connected to the positive data transmission lane DP-TLIS and a fourth negative data input terminal DN (−) connected to the negative data transmission lane DN-TLIS, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, and a fourth termination capacitor C2' connected between the fourth node N4 and ground voltage.

In the wearable display system 100 according to the first aspect, the application processor AP is connected to the first and second reception devices MD1 RX and MD2 RX via the common transmission lanes TLIS in the multi-drop mode. Consequently, each reception device must be designed so as to be operated according to a content signal that is transmitted. For example, the first reception device MD1 RX must be selectively operated when the application processor AP transmits first content, and the second reception device MD2 RX must be selectively operated when the application processor AP transmits second content.

The wearable display system 100 according to the first aspect may use enable signals TE1 and TE2 generated based on a content identification signal SG-ID and module identification signals MD-ID1 and MD-ID2 such that a reception device corresponding to content is selected.

To this end, the application processor AP may be further connected to the first reception device MD1 RX and the second reception device MD2 RX via common control line CCL, and may transmit the content identification signal SG-ID synchronized with first and second contents to the first reception device MD1 RX and the second reception device MD2 RX via the common control line CCL. In addition, the first reception device MD1 RX may further have an input terminal for the first module identification signal MD-ID1 preset to a first voltage level (Low), and the second reception device MD2 RX may further have an input terminal for the second module identification signal MD-ID2 preset to a second voltage level (High) different from the first voltage level (Low).

The first enable signal TE1 is a control signal for turning on the termination switches of the first reception device MD1 RX and turning on the receiver of the first reception device MD1 RX such that first content is received by the first display module MD1. The second enable signal TE2 is a control signal for turning on the termination switches of the second reception device MD2 RX and turning on the receiver of the second reception device MD2 RX such that second content is received by the second display module MD2.

The first enable signal TE1 and the second enable signal TE2 must be selectively enabled. If the first enable signal TE1 and the second enable signal TE2 are simultaneously enabled, the termination resistance value between the positive (+) input terminal and the negative (−) input terminal of each receiver is reduced to half of a normal set value, whereby the receiver may malfunction. Also, if the first enable signal TE1 and the second enable signal TE2 are simultaneously disabled, the termination resistance value between the positive (+) input terminal and the negative (−) input terminal of each receiver becomes infinite, whereby the receiver may malfunction.

In order to selectively enable the first enable signal TE1 and the second enable signal TE2, the first reception device MD1 RX may further include a first operator XNOR1, and the second reception device MD2 RX may further include a second operator XNOR2.

The first operator XNOR1 may XNOR-operate the content identification signal SG-ID and the first module identification signal MD-ID1 to generate the first enable signal TE1, and the second operator XNOR2 may XNOR-operate the content identification signal SG-ID and the second module identification signal MD-ID2 to generate the second enable signal TE2. The first enable signal TE1 is applied to gate electrodes of the termination switches provided in the first reception device MD1 RX, and is also applied to an enable terminal ENA provided in the receiver of the first reception device MD1 RX. The second enable signal TE2 is applied to gate electrodes of the termination switches provided in the second reception device MD2 RX, and is also applied to an enable terminal ENA provided in the receiver of the second reception device MD2 RX.

The first module identification signal MD-ID1 may be set to low voltage (e.g. "0") by default and the second module identification signal MD-ID2 may be set to high voltage (e.g. "1") by default such that the first reception device MD1 RX and the second reception device MD2 RX are distinguished from each other.

As shown in FIG. 6, the content identification signal SG-ID is synchronized with the first and second content. As an example, the first content may be transmitted during a period in which the content identification signal SG-ID is maintained at low voltage, and the second content may be transmitted during a period in which the content identification signal SG-ID is maintained at high voltage.

When the application processor AP transmits the first content in the state in which the content identification signal is low voltage ("0"), as shown in FIGS. 6 and 7, the first enable signal TE1, which is the output of the first operator XNOR1, is selectively enabled. The reason for this is that the second module identification signal MD-ID2 of the second reception device MD2 RX is set to high voltage (e.g. "1") whereas the first module identification signal MD-ID1 of the first reception device MD1 RX is set to low voltage (e.g. "0"). When the first enable signal TE1 is enabled, as described above, the termination switches of the first reception device MD1 RX are turned on and the receiver of the first reception device MD1 RX is turned on, whereby the first display module MD1 may receive the first content.

On the other hand, when the application processor AP transmits the second content in the state in which the content identification signal is high voltage ("1"), as shown in FIGS. 6 and 7, the second enable signal TE2, which is the output of the second operator XNOR2, is selectively enabled. The reason for this is that the first module identification signal MD-ID1 of the first reception device MD1 RX is set to low voltage (e.g. "0") whereas the second module identification signal MD-ID2 of the second reception device MD2 RX is set to high voltage (e.g. "1"). When the second enable signal TE2 is enabled, as described above, the termination switches of the second reception device MD2 RX are turned on and the receiver of the second reception device MD2 RX is turned on, whereby the second display module MD2 may receive the second content.

Second Aspect

Figure 9:
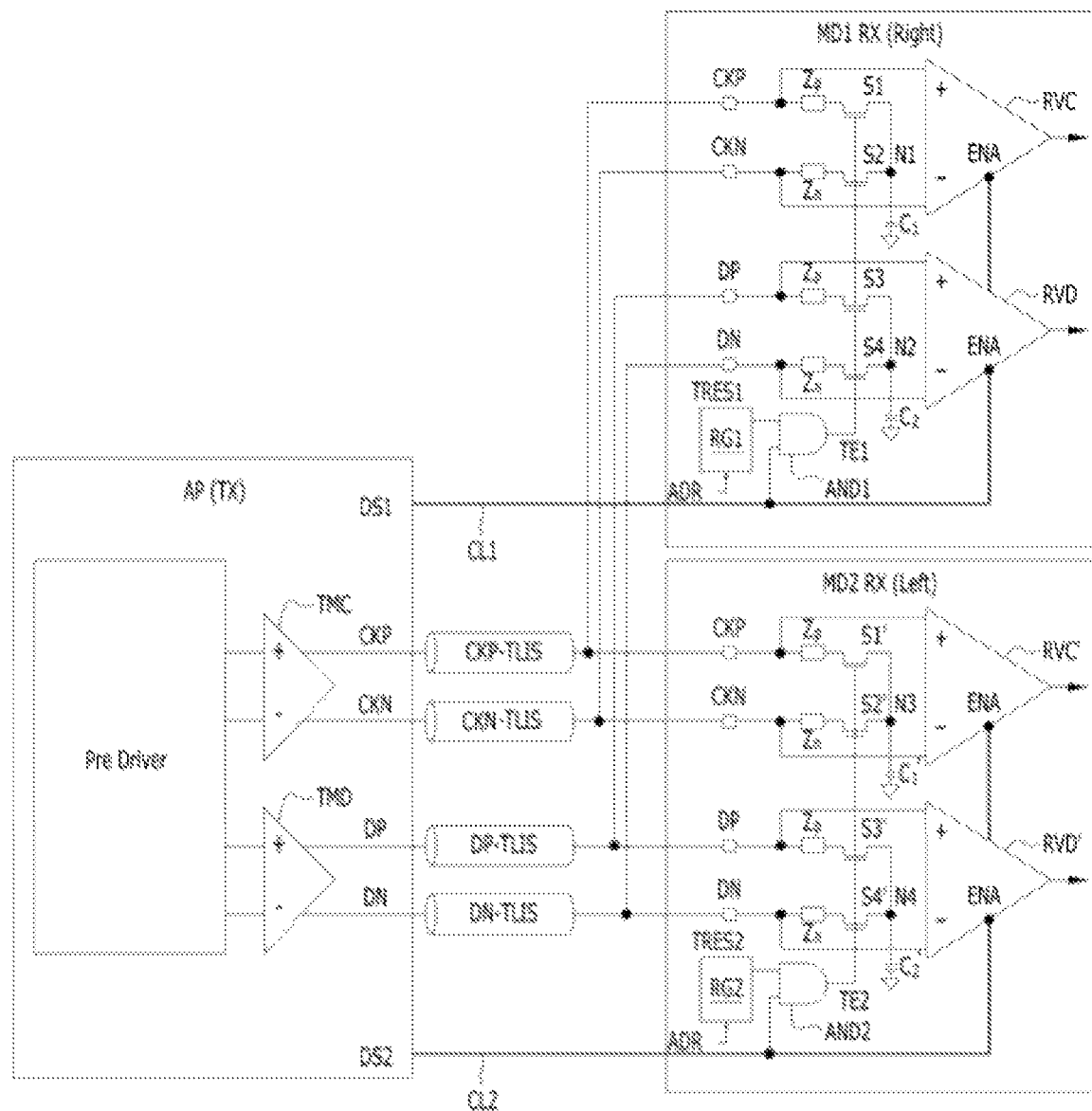

FIGS. 8 and 9 are views showing interface connection construction between an application processor and display modules according to a second aspect of the present disclosure. FIG. 10 is a view showing first to third content signals transmitted in a state of being synchronized with two content/module identification signals. FIG. 11 is a view showing a function table related to operation of FIG. 9.

Referring to FIGS. 8 and 9, the wearable display system 200 according to the second aspect of the present disclosure may include a first display module MD1, a second display module MD2, and an application processor AP.

The first display module MD1 may be mounted at one side of a head mounted structure to provide first content (e.g. right-eye content) to the right eye of a user. The second display module MD2 may be mounted at the other side of the head mounted structure to provide second content (e.g. left-eye content) to the left eye of the user. The first and second display modules MD1 and MD2 may simultaneously provide third content, which is common content, to the left and right eyes of the user. The application processor AP is connected to a first reception device MD1 RX of the first display module MD1 and to a second reception device MD2 RX of the second display module MD2 via common transmission lanes TLIS. The application processor AP is also mounted to the head mounted structure. The application processor AP transmits the first or third content to the first reception device MD1 RX and transmits the second or third content to the second reception device MD2 RX via the common transmission lanes TLIS in a multi-drop mode, whereby the number of transmission lanes and power consumption may be reduced and interface connection construction may be simplified in implementing augmented reality.

The wearable display system 200 according to the second aspect of the present disclosure may adopt a clock separable interface mode. In this case, the common transmission lanes TLIS include a positive data transmission lane DP-TLIS and a negative data transmission lane DN-TLIS for differential signaling. In addition, the common transmission lanes TLIS include a positive clock transmission lane CKP-TLIS and a negative clock transmission lane CKN-TLIS for differential signaling.

In the case in which the clock separable interface mode is adopted, a transmission device AP TX of the application processor AP and the first and second reception devices MD1 RX and MD2 RX may be implemented as shown in FIG. 9.

Specifically, the transmission device AP TX of the application processor AP includes a pre-drive unit configured to serialize clock and data to be transmitted into a differential type, a first transmitter TMC configured to output the clock processed into the differential serial type to the positive clock transmission lane CKP-TLIS and the negative clock transmission lane CKN-TLIS, and a second transmitter TMD configured to output the data processed into the differential serial type to the positive data transmission lane DP-TLIS and the negative data transmission lane DN-TLIS.

The first reception device MD1 RX has a first receiver RVC having a first positive clock input terminal CKP (+) connected to the positive clock transmission lane CKP-TLIS and a first negative clock input terminal CKN (−) connected to the negative clock transmission lane CKN-TLIS. In addition, the first reception device MD1 RX has a second receiver RVD having a second positive data input terminal DP (+) connected to the positive data transmission lane DP-TLIS and a second negative data input terminal DN (−) connected to the negative data transmission lane DN-TLIS. In addition, the first reception device MD1 RX includes a first termination resistor Zp and a first termination switch S1 connected in series between the first positive clock input terminal CKP (+) and a first node N1, a second termination resistor Zn and a second termination switch S2 connected in series between the first negative clock input terminal CKN (−) and the first node N1, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, a first termination capacitor C1 connected between the first node N1 and ground voltage, and a second termination capacitor C2 connected between the second node N2 and the ground voltage.

The second reception device MD2 RX has a third receiver RVC' having a third positive clock input terminal CKP (+) connected to the positive clock transmission lane CKP-TLIS and a third negative clock input terminal CKN (−) connected to the negative clock transmission lane CKN-TLIS. In addition, the second reception device MD2 RX has a fourth receiver RVD' having a fourth positive data input terminal DP (+) connected to the positive data transmission lane DP-TLIS and a fourth negative data input terminal DN (−) connected to the negative data transmission lane DN-TLIS.

In addition, the second reception device MD2 RX includes a fifth termination resistor Zp and a fifth termination switch S1' connected in series between the third positive clock input terminal CKP (+) and a third node N3, a sixth termination resistor Zn and a sixth termination switch S2' connected in series between the third negative clock input terminal CKN (−) and the third node N3, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, a third termination capacitor C1' connected between the third node N3 and ground voltage, and a fourth termination capacitor C2' connected between the fourth node N4 and the ground voltage.

Meanwhile, the wearable display system 200 according to the second aspect may adopt a clock embedded interface mode. In this case, the common transmission lanes TLIS include a positive data transmission lane DP-TLIS and a negative data transmission lane DN-TLIS for differential signaling.

In the case in which the clock embedded interface mode is adopted, the first transmitter TMC of the transmission device AP TX of the application processor AP, the positive clock transmission lane CKP-TLIS, the negative clock transmission lane CKN-TLIS, the first receiver RVC of the first reception device MD1 RX, the third receiver RVC' of the second reception device MD2 RX, the first termination resistor Zp, the first termination switch S1, the second termination resistor Zn, the second termination switch S2, the fifth termination resistor Zp, the fifth termination switch S1', the sixth termination resistor Zn, and the sixth termination switch S2' may be omitted from FIG. 9.

In other words, the first reception device MD1 RX may include a second receiver RVD having a second positive data input terminal DP (+) connected to the positive data transmission lane DP-TLIS and a second negative data input terminal DN (−) connected to the negative data transmission lane DN-TLIS, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, and a second termination capacitor C2 connected between the second node N2 and ground voltage.

In addition, the second reception device MD2 RX may include a fourth receiver RVD' having a fourth positive data input terminal DP (+) connected to the positive data transmission lane DP-TLIS and a fourth negative data input terminal DN (−) connected to the negative data transmission lane DN-TLIS, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, and a fourth termination capacitor C2' connected between the fourth node N4 and ground voltage.

In the wearable display system 200 according to the second aspect, the application processor AP is connected to the first and second reception devices MD1 RX and MD2 RX via the common transmission lanes TLIS in the multi-drop mode. Consequently, each reception device must be designed so as to be operated according to a content signal that is transmitted. For example, the first reception device MD1 RX must be selectively operated when the application processor AP transmits first content, the second reception device MD2 RX must be selectively operated when the application processor AP transmits second content, and the first and second reception device MD1 RX and MD2 RX must be simultaneously operated when the application processor AP transmits third content. Here, the third content is commonly provided to the left and right eyes of the user.

The wearable display system 200 according to the second aspect may use a first content/module identification signal DS1 and a second content/module identification signal DS2 such that a reception device corresponding to content is selected. The first content/module identification signal DS1 and the second content/module identification signal DS2 may be selectively transmitted in a state of high voltage ("1") or may be simultaneously transmitted in a state of high voltage ("1"). In the case in which the first content/module identification signal DS1 is selectively transmitted in a state of high voltage ("1"), the first reception device MD1 RX may be turned on. In the case in which the second content/module identification signal DS2 is selectively transmitted in a state of high voltage ("1"), the second reception device MD2 RX may be turned on. In the case in which both the first and second content/module identification signals DS1 and DS2 are transmitted in a state of high voltage ("1"), the first and second reception devices MD1 RX and MD2 RX may be simultaneously turned on.

To this end, the application processor AP may be further connected to the first reception device MD1 RX via a first control line CL1 and may be further connected to the second reception device MD2 RX via a second control line CL2. The application processor AP may transmit the first content/module identification signal DS1 synchronized with first to third content to the first reception device MD1 RX via the first control line CL1, and may transmit the second content/module identification signal DS2 synchronized with first to third content to the second reception device MD2 RX via the second control line CL2.

Meanwhile, a first enable signal TE1 and a second enable signal TE2 must be selectively enabled. If the first enable signal TE1 and the second enable signal TE2 are simultaneously enabled, the termination resistance value between the positive (+) input terminal and the negative (−) input terminal of each receiver is reduced to half of a normal set value, whereby the receiver may malfunction. Also, if the first enable signal TE1 and the second enable signal TE2 are simultaneously disabled, the termination resistance value between the positive (+) input terminal and the negative (−) input terminal of each receiver becomes infinite, whereby the receiver may malfunction.

In order to selectively enable the first enable signal TE1 and the second enable signal TE2, the first reception device MD1 RX may further include a first register RG1 set so as to output first register information TRES1 according to an address signal ADR when the first content/module identification signal DS1 is high voltage and a first operator AND1 configured to AND-operate the first content/module identification signal DS1 and the first register information TRES1 to generate the first enable signal TE1. The second reception device MD2 RX may further include a second register RG2 set so as to output second register information TRES2 according to the address signal ADR when the second content/module identification signal DS2 is high voltage and a second operator AND2 configured to AND-operate the second content/module identification signal DS2 and the second register information TRES2 to generate the second enable signal TE2. Here, the address signal ADR may be transmitted from the application processor AP to the first and second reception devices MD1 RX and MD2 RX via the common transmission lanes TLIS in a state of being included in the content signals; however, the present disclosure is not limited thereto. The address signal ADR may be transmitted from the application processor AP to the first and second reception devices MD1 RX and MD2 RX via the first and second control lines CL1 and CL2.

In order to selectively enable the first enable signal TE1 and the second enable signal TE2, in other words, to normally transmit and receive content, at least one of the first register information TRES1 and the second register information TRES2 must be high voltage ("1").

The first enable signal TE1 is a control signal that is applied to gate electrodes of the termination switches provided in the first reception device MD1 RX to turn on the termination switches. The second enable signal TE2 is a control signal that is applied to gate electrodes of the termination switches provided in the second reception device MD2 RX to turn on the termination switches.

As shown in FIG. 10, the first and second content/module identification signals DS1 and DS2 are synchronized with the first to third content. As an example, the first content may be transmitted during a period in which the first content/module identification signal DS1 is high voltage and the second enable signal TE2 is maintained at low voltage, whereas the second content may be transmitted during a period in which the first content/module identification signal DS1 is low voltage and the second enable signal TE2 is maintained at high voltage. The third content may be transmitted during a period in which both the first and second content/module identification signals DS1 and DS2 are maintained at high voltage.

Under the condition in which the first enable signal TE1 and the second enable signal TE2 are selectively enabled, as shown in FIGS. 10 and 11, the reception device (or the reception devices) corresponding to high voltage of the first content/module identification signal DS1 and/or the second content/module identification signal DS2 may receive at least one of the first to third content from the application processor AP via the common transmission lanes TLIS.

Specifically, one of a first switch group including the termination switches of the first reception device MD1 RX and a second switch group including the termination switches of the second reception device MD2 RX is turned on by selectively enabling the first enable signal TE1 and the second enable signal TE2. At this time, when the first content/module identification signal DS1 is selectively transmitted in a state of high voltage, the receiver of the first reception device MD1 RX is turned on, whereby the first display module MD1 may receive the first content.

One of the first switch group including the termination switches of the first reception device MD1 RX and the second switch group including the termination switches of the second reception device MD2 RX is turned on by selectively enabling the first enable signal TE1 and the second enable signal TE2. At this time, when the second content/module identification signal DS2 is selectively transmitted in a state of high voltage, the receiver of the second reception device MD2 RX is turned on, whereby the second display module MD2 may receive the second content.

One of the first switch group including the termination switches of the first reception device MD1 RX and the second switch group including the termination switches of the second reception device MD2 RX is turned on by selectively enabling the first enable signal TE1 and the second enable signal TE2. At this time, when the first content/module identification signal DS1 and the second content/module identification signal DS2 are simultaneously transmitted in a state of high voltage, both the receiver of the first reception device MD1 RX and the receiver of the second reception device MD2 RX are turned on, whereby the first and second display modules MD1 and MD2 may receive the third content.

Third Aspect

Figure 12:
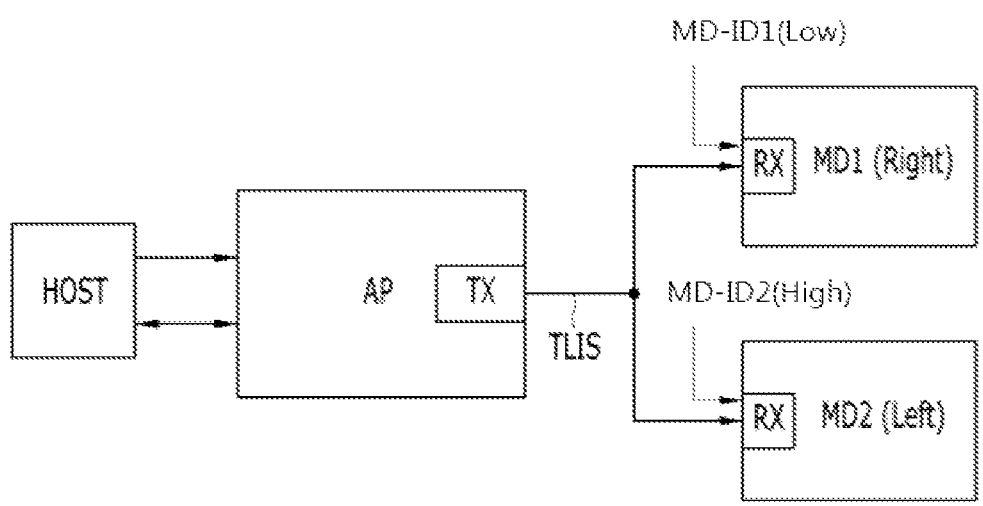
FIGS. 12 and 13 are views showing interface connection construction between an application processor and display modules according to a third aspect of the present disclosure.
Figure 13:
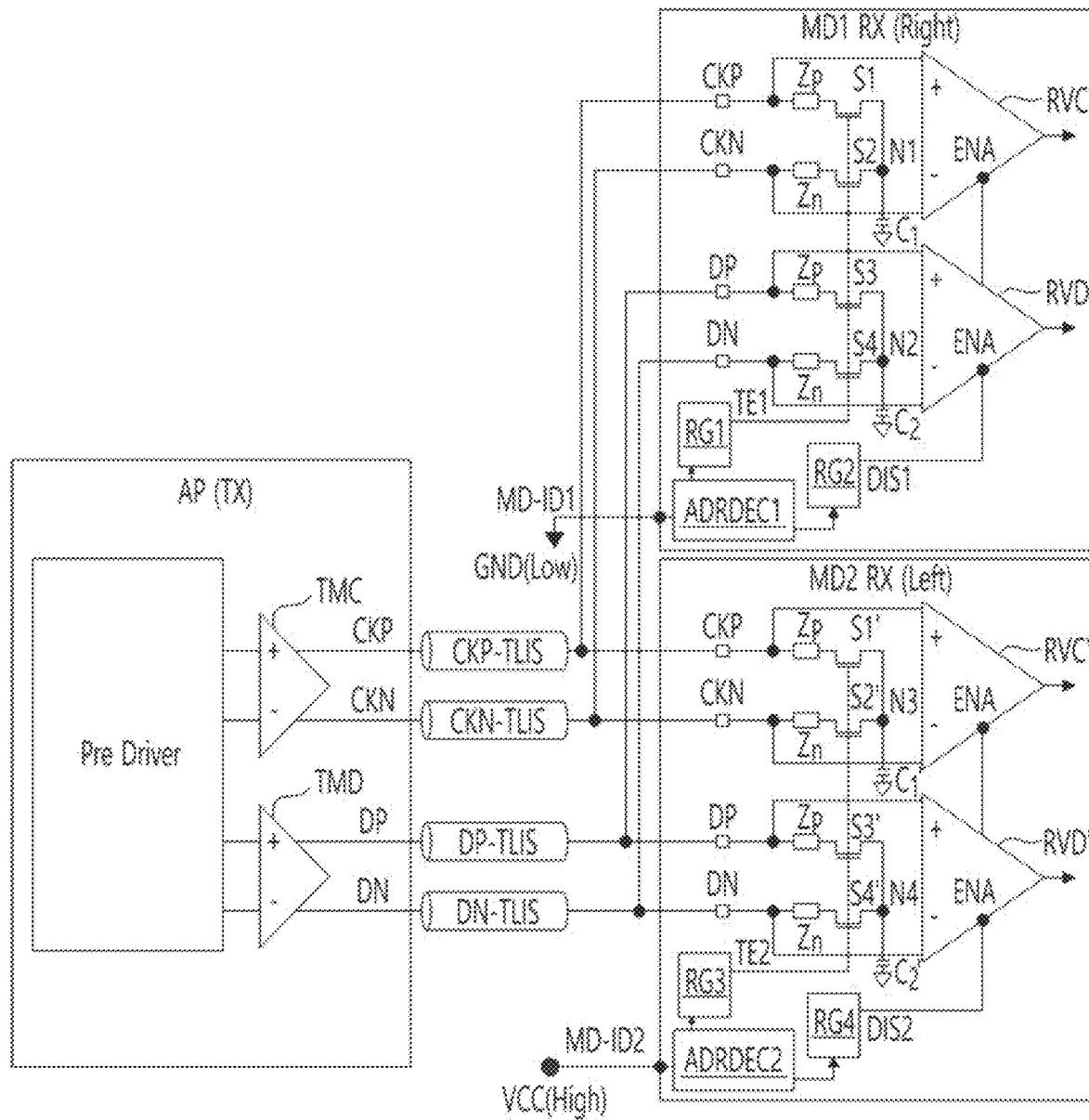
Figure 14:
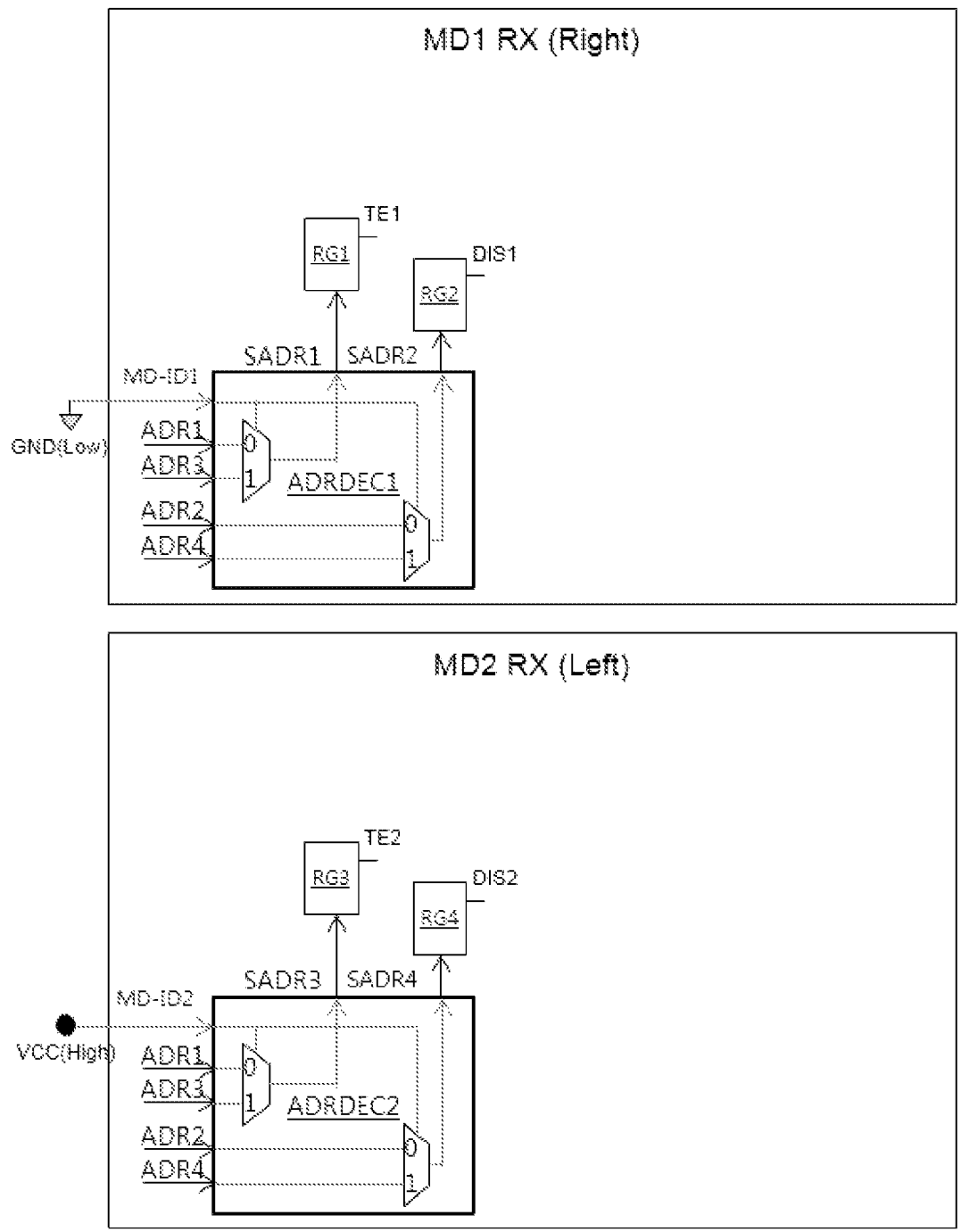
FIG. 14 is a view illustrating operation of address interpreters of FIG. 13.
Figures 15, 16:
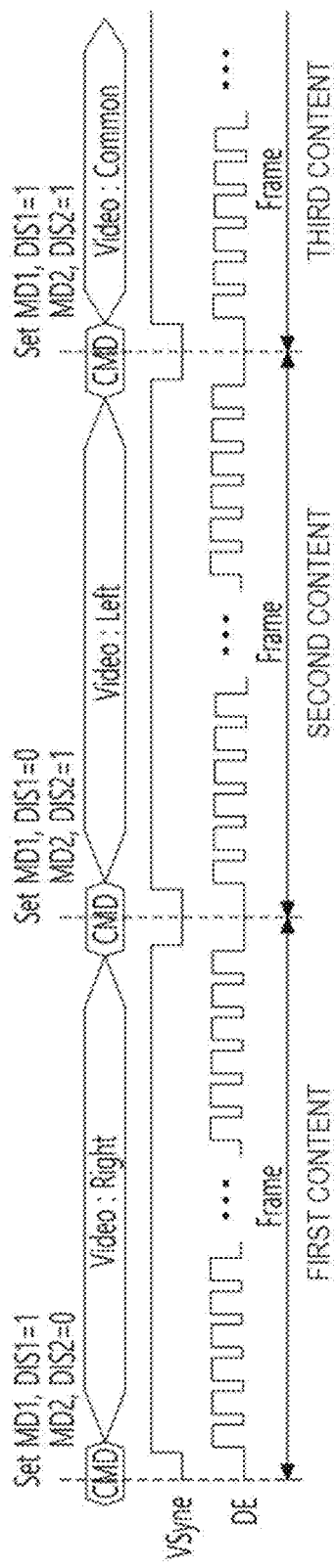
FIG. 15 is a view showing image frame signals transmitted in a state of being synchronized with content identification signals.
FIG. 16 is a view showing a function table related to operation of FIG. 13.

FIGS. 12 and 13 are views showing interface connection construction between an application processor and display modules according to a third aspect of the present disclosure. FIG. 14 is a view illustrating operation of address interpreters of FIG. 13. FIG. 15 is a view showing image frame signals transmitted in a state of being synchronized with content identification signals. FIG. 16 is a view showing a function table related to operation of FIG. 13.

Referring to FIGS. 12 and 13, the wearable display system 300 according to the third aspect of the present disclosure may include a first display module MD1, a second display module MD2, and an application processor AP.

The first display module MD1 may be mounted at one side of a head mounted structure to provide first content (e.g. right-eye content) to the right eye of a user. The second display module MD2 may be mounted at the other side of the head mounted structure to provide second content (e.g. left-eye content) to the left eye of the user. The first and second display modules MD1 and MD2 may simultaneously provide third content, which is common content, to the left and right eyes of the user. The application processor AP is connected to a first reception device MD1 RX of the first display module MD1 and to a second reception device MD2 RX of the second display module MD2 via common transmission lanes TLIS. The application processor AP is also mounted to the head mounted structure. The application processor AP transmits the first or third content to the first reception device MD1 RX and transmits the second or third content to the second reception device MD2 RX via the common transmission lanes TLIS in a multi-drop mode, whereby the number of transmission lanes and power consumption may be reduced and interface connection construction may be simplified in implementing augmented reality.

The wearable display system 300 according to the third aspect of the present disclosure may adopt a clock separable interface mode. In this case, the common transmission lanes TLIS include a positive data transmission lane DP-TLIS and a negative data transmission lane DN-TLIS for differential signaling. In addition, the common transmission lanes TLIS include a positive clock transmission lane CKP-TLIS and a negative clock transmission lane CKN-TLIS for differential signaling.

In the case in which the clock separable interface mode is adopted, a transmission device AP TX of the application processor AP and the first and second reception devices MD1 RX and MD2 RX may be implemented as shown in FIG. 13.

Specifically, the transmission device AP TX of the application processor AP includes a pre-drive unit configured to serialize clock and data to be transmitted into a differential type, a first transmitter TMC configured to output the clock processed into the differential serial type to the positive clock transmission lane CKP-TLIS and the negative clock transmission lane CKN-TLIS, and a second transmitter TMD configured to output the data processed into the differential serial type to the positive data transmission lane DP-TLIS and the negative data transmission lane DN-TLIS.

The first reception device MD1 RX has a first receiver RVC having a first positive clock input terminal CKP (+) connected to the positive clock transmission lane CKP-TLIS and a first negative clock input terminal CKN (−) connected to the negative clock transmission lane CKN-TLIS. In addition, the first reception device MD1 RX has a second receiver RVD having a second positive data input terminal DP (+) connected to the positive data transmission lane DP-TLIS and a second negative data input terminal DN (−) connected to the negative data transmission lane DN-TLIS. In addition, the first reception device MD1 RX includes a first termination resistor Zp and a first termination switch S1 connected in series between the first positive clock input terminal CKP (+) and a first node N1, a second termination resistor Zn and a second termination switch S2 connected in series between the first negative clock input terminal CKN (−) and the first node N1, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, a first termination capacitor C1 connected between the first node N1 and ground voltage, and a second termination capacitor C2 connected between the second node N2 and the ground voltage.

The second reception device MD2 RX has a third receiver RVC' having a third positive clock input terminal CKP (+) connected to the positive clock transmission lane CKP-TLIS and a third negative clock input terminal CKN (−) connected to the negative clock transmission lane CKN-TLIS. In addition, the second reception device MD2 RX has a fourth receiver RVD' having a fourth positive data input terminal DP (+) connected to the positive data transmission lane DP-TLIS and a fourth negative data input terminal DN (−) connected to the negative data transmission lane DN-TLIS. In addition, the second reception device MD2 RX includes a fifth termination resistor Zp and a fifth termination switch S1' connected in series between the third positive clock input terminal CKP (+) and a third node N3, a sixth termination resistor Zn and a sixth termination switch S2' connected in series between the third negative clock input terminal CKN (−) and the third node N3, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, a third termination capacitor C1' connected between the third node N3 and ground voltage, and a fourth termination capacitor C2' connected between the fourth node N4 and the ground voltage.

Meanwhile, the wearable display system 300 according to the third aspect may adopt a clock embedded interface mode. In this case, the common transmission lanes TLIS include a positive data transmission lane DP-TLIS and a negative data transmission lane DN-TLIS for differential signaling.

In the case in which the clock embedded interface mode is adopted, the first transmitter TMC of the transmission device AP TX of the application processor AP, the positive clock transmission lane CKP-TLIS, the negative clock transmission lane CKN-TLIS, the first receiver RVC of the first reception device MD1 RX, the third receiver RVC' of the second reception device MD2 RX, the first termination resistor Zp, the first termination switch S1, the second termination resistor Zn, the second termination switch S2, the fifth termination resistor Zp, the fifth termination switch S1', the sixth termination resistor Zn, and the sixth termination switch S2' may be omitted from FIG. 13.

In other words, the first reception device MD1 RX may include a second receiver RVD having a second positive data input terminal DP (+) connected to the positive data transmission lane DP-TLIS and a second negative data input terminal DN (−) connected to the negative data transmission lane DN-TLIS, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, and a second termination capacitor C2 connected between the second node N2 and ground voltage.

In addition, the second reception device MD2 RX may include a fourth receiver RVD' having a fourth positive data input terminal DP (+) connected to the positive data transmission lane DP-TLIS and a fourth negative data input terminal DN (−) connected to the negative data transmission lane DN-TLIS, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, and a fourth termination capacitor C2' connected between the fourth node N4 and ground voltage.

In the wearable display system 300 according to the third aspect, the application processor AP is connected to the first and second reception devices MD1 RX and MD2 RX via the common transmission lanes TLIS in the multi-drop mode. Consequently, each reception device must be designed so as to be operated according to a content signal that is transmitted. For example, the first reception device MD1 RX must be selectively operated when the application processor AP transmits first content, the second reception device MD2 RX must be selectively operated when the application processor AP transmits second content, and the first and second reception devices MD1 RX and MD2 RX must be simultaneously operated when the application processor AP transmits third content. Here, the third content is commonly provided to the left and right eyes of the user.

The wearable display system 300 according to the third aspect may use a first content identification signal DIS1 according to a second address signal ADR2 and a second content identification signal DIS2 according to a fourth address signal ADR4 such that a reception device corresponding to content is selected. The second address signal ADR2 and the fourth address signal ADR4, which are command signals transmittable in a state of being included in content signals, may be controlled by the application processor AP.

The first content identification signal DIS1 and the second content identification signal DIS2 may be selectively enabled in a state of high voltage ("1") or may be simultaneously enabled in a state of high voltage ("1"). When the first content identification signal DIS1 is selectively enabled, the first reception device MD1 RX may be turned on. When the second content identification signal DIS2 is selectively enabled, the second reception device MD2 RX may be turned on. When both the first and second content identification signals DIS1 and DIS2 are enabled, the first and second reception devices MD1 RX and MD2 RX may be simultaneously turned on.

To this end, the application processor AP may control output of registers provided in the first reception device MD1 RX using a first address signal ADR1 and the second address signal ADR2, and may control output of registers provided in the second reception device MD2 RX using a third address signal ADR3 and the fourth address signal ADR4. Here, the first address signal ADR1 and the third address signal ADR3, which are also command signals transmittable in a state of being included in content signals, may be controlled by the application processor AP.

The first reception device MD1 RX and the second reception device MD2 RX may be separably operated by module identification signals MD-ID1 and MD-ID2.

The first reception device MD1 RX may further include an input terminal for the first module identification signal MD-ID1 preset to a first voltage level (Low), a first address selector ADRDEC1 configured to select the first address signal ADR1 and the second address signal ADR2 from among the first to fourth address signals ADR1 to ADR4 transmitted from the application processor AP according to the first module identification signal MD-ID1, a first register RG1 set so as to output a first enable signal TE1 according to the first address signal ADR1, and a second register RG2 set so as to output the first content identification signal DIS1 according to the second address signal ADR2. Here, the first address selector ADRDEC1 may include a first selector and a second selector. The first selector selects the first address signal ADR1 from among the first and third address signals ADR1 and ADR3 and supplies the first address signal ADR1 to the first register RG1 according to the first module identification signal MD-ID1. The first register RG1 outputs the first enable signal TE1 according to a first selection address signal SADR1. The second selector selects the second address signal ADR2 from among the second and fourth address signals ADR2 and ADR4 and supplies the second address signal ADR2 to the second register RG2 according to the first module identification signal MD-ID1. The second register RG2 outputs the first content identification signal DIS1 according to a second selection address signal SADR2.

The second reception device MD2 RX may further include an input terminal for the second module identification signal MD-ID2 preset to a second voltage level (High), a second address selector ADRDEC2 configured to select the third address signal ADR3 and the fourth address signal ADR4 from among the first to fourth address signals ADR1 to ADR4 transmitted from the application processor AP according to the second module identification signal MD-ID2, a third register RG3 set so as to output a second enable signal TE2 according to the third address signal ADR3, and a fourth register RG4 set so as to output the second content identification signal DIS2 according to the fourth address signal ADR4. Here, the second address selector ADRDEC2 may include a third selector and a fourth selector. The third selector selects the third address signal ADR3 from among the first and third address signals ADR1 and ADR3 and supplies the third address signal ADR3 to the third register RG3 according to the second module identification signal MD-ID2. The third register RG3 outputs the second enable signal TE2 according to a third selection address signal SADR3. The fourth selector selects the fourth address signal ADR4 from among the second and fourth address signals ADR2 and ADR4 and supplies the fourth address signal ADR4 to the fourth register RG4 according to the second module identification signal MD-ID2. The fourth register RG4 outputs the second content identification signal DIS2 according to a fourth selection address signal SADR4.

Meanwhile, the first enable signal TE1 and the second enable signal TE2 must be selectively enabled. If the first enable signal TE1 and the second enable signal TE2 are simultaneously enabled, the termination resistance value between the positive (+) input terminal and the negative (−) input terminal of each receiver is reduced to half of a normal set value, whereby the receiver may malfunction. Also, if the first enable signal TE1 and the second enable signal TE2 are simultaneously disabled, the termination resistance value between the positive (+) input terminal and the negative (−) input terminal of each receiver becomes infinite, whereby the receiver may malfunction.

In order to selectively enable the first enable signal TE1 and the second enable signal TE2, the first address signal ADR1 and the third address signal ADR3 may be set to opposite voltage levels.

The first enable signal TE1 is a control signal that is applied to gate electrodes of the termination switches provided in the first reception device MD1 RX to turn on the termination switches. The second enable signal TE2 is a control signal that is applied to gate electrodes of the termination switches provided in the second reception device MD2 RX to turn on the termination switches.

As shown in FIG. 15, the first and second content identification signals DIS1 and DIS2 are synchronized with the first to third content. As an example, the first content may be transmitted during a period in which the first content identification signal DIS1 is high voltage and the second enable signal TE2 is maintained at low voltage, whereas the second content may be transmitted during a period in which the first content identification signal DIS1 is low voltage and the second enable signal TE2 is maintained at high voltage. The third content may be transmitted during a period in which both the first and second content identification signals DIS1 and DIS2 are maintained at high voltage.

Under the condition in which the first enable signal TE1 and the second enable signal TE2 are selectively enabled, as shown in FIGS. 15 and 16, the reception device (or the reception devices) corresponding to high voltage of the first content identification signal DIS1 and/or the second content identification signal DIS2 may receive at least one of the first to third content from the application processor AP via the common transmission lanes TLIS.

Specifically, one of a first switch group including the termination switches of the first reception device MD1 RX and a second switch group including the termination switches of the second reception device MD2 RX is turned on by selectively enabling the first enable signal TE1 and the second enable signal TE2. At this time, when the first content identification signal DIS1 is selectively enabled in a state of high voltage, the receiver of the first reception device MD1 RX is turned on, whereby the first display module MD1 may receive the first content.

One of the first switch group including the termination switches of the first reception device MD1 RX and the second switch group including the termination switches of the second reception device MD2 RX is turned on by selectively enabling the first enable signal TE1 and the second enable signal TE2. At this time, when the second content identification signal DIS2 is selectively enabled in a state of high voltage, the receiver of the second reception device MD2 RX is turned on, whereby the second display module MD2 may receive the second content.

One of the first switch group including the termination switches of the first reception device MD1 RX and the second switch group including the termination switches of the second reception device MD2 RX is turned on by selectively enabling the first enable signal TE1 and the second enable signal TE2. At this time, when the first content identification signal DIS1 and the second content identification signal DIS2 are simultaneously enabled in a state of high voltage, both the receiver of the first reception device MD1 RX and the receiver of the second reception device MD2 RX are turned on, whereby the first and second display modules MD1 and MD2 may receive the third content.

The aspects of the present disclosure described above may include the following construction.

A wearable display system according to an aspect of the present disclosure includes a head mounted structure 10, a first display module MD1 mounted at one side of the head mounted structure to provide first content, a second display module MD2 mounted at the other side of the head mounted structure to provide second content, and an application processor AP connected to a first reception device MD1 RX of the first display module and a second reception device MD2 RX of the second display module via common transmission lanes TLIS, wherein the application processor AP transmits both the first content and the second content via the common transmission lanes TLIS.

In the wearable display system according to the aspect of the present disclosure, the common transmission lanes TLIS include a positive data transmission lane DP-TLIS and a negative data transmission lane DN-TLIS for differential signaling.

In the wearable display system according to the aspect of the present disclosure, the first reception device MD1 RX includes a second receiver RVD having a second positive data input terminal DP (+) connected to the positive data transmission lane DP-TLIS and a second negative data input terminal DN (−) connected to the negative data transmission lane DN-TLIS, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, and a second termination capacitor C2 connected between the second node N2 and ground voltage.

In the wearable display system according to the aspect of the present disclosure, the second reception device MD2 RX includes a fourth receiver RVD' having a fourth positive data input terminal DP (+) connected to the positive data transmission lane DP-TLIS and a fourth negative data input terminal DN (−) connected to the negative data transmission lane DN-TLIS, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, and a fourth termination capacitor C2' connected between the fourth node N4 and ground voltage.

In the wearable display system according to the aspect of the present disclosure, the common transmission lanes TLIS further include a positive clock transmission lane CKP-TLIS and a negative clock transmission lane CKN-TLIS for differential signaling.

In the wearable display system according to the aspect of the present disclosure, the first reception device MD1 RX includes a first receiver RVC having a first positive clock input terminal CKP (+) connected to the positive clock transmission lane CKP-TLIS and a first negative clock input terminal CKN (−) connected to the negative clock transmission lane CKN-TLIS, a second receiver RVD having a second positive data input terminal DP (+) connected to the positive data transmission lane DP-TLIS and a second negative data input terminal DN (−) connected to the negative data transmission lane DN-TLIS, a first termination resistor Zp and a first termination switch S1 connected in series between the first positive clock input terminal CKP (+) and a first node N1, a second termination resistor Zn and a second termination switch S2 connected in series between the first negative clock input terminal CKN (−) and the first node N1, a third termination resistor Zp and a third termination switch S3 connected in series between the second positive data input terminal DP (+) and a second node N2, a fourth termination resistor Zn and a fourth termination switch S4 connected in series between the second negative data input terminal DN (−) and the second node N2, a first termination capacitor C1 connected between the first node N1 and ground voltage, and a second termination capacitor C2 connected between the second node N2 and the ground voltage.

In the wearable display system according to the aspect of the present disclosure, the second reception device MD2 RX includes a third receiver RVC' having a third positive clock input terminal CKP (+) connected to the positive clock transmission lane CKP-TLIS and a third negative clock input terminal CKN (−) connected to the negative clock transmission lane CKN-TLIS, a fourth receiver RVD' having a fourth positive data input terminal DP (+) connected to the positive data transmission lane DP-TLIS and a fourth negative data input terminal DN (−) connected to the negative data transmission lane DN-TLIS, a fifth termination resistor Zp and a fifth termination switch S1' connected in series between the third positive clock input terminal CKP (+) and a third node N3, a sixth termination resistor Zn and a sixth termination switch S2' connected in series between the third negative clock input terminal CKN (−) and the third node N3, a seventh termination resistor Zp and a seventh termination switch S3' connected in series between the fourth positive data input terminal DP (+) and a fourth node N4, an eighth termination resistor Zn and an eighth termination switch S4' connected in series between the fourth negative data input terminal DN (−) and the fourth node N4, a third termination capacitor C1' connected between the third node N3 and ground voltage, and a fourth termination capacitor C2' connected between the fourth node N4 and the ground voltage.

In the wearable display system according to the aspect of the present disclosure, the application processor AP is further connected to the first reception device MD1 RX and the second reception device MD2 RX via common control line CCL, and transmits a content identification signal SG-ID synchronized with the first and second contents to the first reception device MD1 RX and the second reception device MD2 RX via the common control line CCL.

In the wearable display system according to the aspect of the present disclosure, the first reception device MD1 RX further includes an input terminal for a first module identification signal MD-ID1 preset to a first voltage level (Low) and a first operator XNOR1 configured to XNOR-operate the content identification signal SG-ID and the first module identification signal MD-ID1 to generate a first enable signal TE1, and the second reception device MD2 RX further includes an input terminal for a second module identification signal MD-ID2 preset to a second voltage level (High) different from the first voltage level (Low) and a second operator XNOR2 configured to XNOR-operate the content identification signal SG-ID and the second module identification signal MD-ID2 to generate a second enable signal TE2.

In the wearable display system according to the aspect of the present disclosure, the first enable signal TE1 and the second enable signal TE2 are selectively enabled, when the first enable signal TE1 is enabled, the termination switches of the first reception device MD1 RX are turned on and the receiver of the first reception device MD1 RX is turned on, whereby the first display module MD1 receives the first content, and, when the second enable signal TE2 is enabled, the termination switches of the second reception device MD2 RX are turned on and the receiver of the second reception device MD2 RX is turned on, whereby the second display module MD2 receives the second content.

In the wearable display system according to the aspect of the present disclosure, the application processor AP is further connected to the first reception device MD1 RX via a first control line CL1 and is further connected to the second reception device MD2 RX via a second control line CL2, transmits a first content/module identification signal DS1 synchronized with the first and second contents and third content to the first reception device MD1 RX via the first control line CL1, and transmits a second content/module identification signal DS2 synchronized with the first to third contents to the second reception device MD2 RX via the second control line CL2, the third content being commonly provided to the first reception device MD1 RX and the second reception device MD2 RX.

In the wearable display system according to the aspect of the present disclosure, the first reception device MD1 RX further includes a first register RG1 set so as to output first register information TRES1 according to an address signal ADR when the first content/module identification signal DS1 is high voltage and a first operator AND1 configured to AND-operate the first content/module identification signal DS1 and the first register information TRES1 to generate a first enable signal TE1, and the second reception device MD2 RX further includes a second register RG2 set so as to output second register information TRES2 according to the address signal ADR when the second content/module identification signal DS2 is high voltage and a second operator AND2 configured to AND-operate the second content/module identification signal DS2 and the second register information TRES2 to generate a second enable signal TE2.

In the wearable display system according to the aspect of the present disclosure, the first content/module identification signal DS1 and the second content/module identification signal DS2 are selectively or simultaneously transmitted in a state of high voltage, and the first enable signal TE1 and the second enable signal TE2 are selectively enabled.

In the wearable display system according to the aspect of the present disclosure, when the first enable signal TE1 and the second enable signal TE2 are selectively enabled and the first content/module identification signal DS1 is selectively transmitted in a state of high voltage, one of a first switch group including the termination switches of the first reception device MD1 RX and a second switch group including the termination switches of the second reception device MD2 RX is turned on, and the receiver of the first reception device MD1 RX is turned on, whereby the first display module MD1 receives the first content.

In the wearable display system according to the aspect of the present disclosure, when the first enable signal TE1 and the second enable signal TE2 are selectively enabled and the second content/module identification signal DS2 is selectively transmitted in a state of high voltage, one of the first switch group including the termination switches of the first reception device MD1 RX and the second switch group including the termination switches of the second reception device MD2 RX is turned on, and the receiver of the second reception device MD2 RX is turned on, whereby the second display module MD2 receives the second content.

In the wearable display system according to the aspect of the present disclosure, when the first enable signal TE1 and the second enable signal TE2 are selectively enabled and the first content/module identification signal DS1 and the second content/module identification signal DS2 are simultaneously transmitted in a state of high voltage, one of the first switch group including the termination switches of the first reception device MD1 RX and the second switch group including the termination switches of the second reception device MD2 RX is turned on, and both the receiver of the first reception device MD1 RX and the receiver of the second reception device MD2 RX are turned on, whereby the first and second display modules MD1 and MD2 receive the third content.

In the wearable display system according to the aspect of the present disclosure, the application processor AP controls output of registers provided in the first reception device MD1 RX using a first address signal ADR1 and a second address signal ADR2 and controls output of registers provided in the second reception device MD2 RX using a third address signal ADR3 and a fourth address signal ADR4, and the first address signal ADR1 and the third address signal ADR3 are set to opposite voltage levels.

In the wearable display system according to the aspect of the present disclosure, the first reception device MD1 RX further includes an input terminal for a first module identification signal MD-ID1 preset to a first voltage level (Low), a first address selector ADRDEC1 configured to select the first address signal ADR1 and the second address signal ADR2 from among the first to fourth address signals ADR1 to ADR4 transmitted from the application processor AP according to the first module identification signal MD-ID1, a first register RG1 set so as to output a first enable signal TE1 according to the selected first address signal ADR1, and a second register RG2 set so as to output a first content identification signal DIS1 according to the selected second address signal ADR2.

In the wearable display system according to the aspect of the present disclosure, the second reception device MD2 RX further includes an input terminal for a second module identification signal MD-ID2 preset to a second voltage level (High) different from the first voltage level (Low), a second address selector ADRDEC2 configured to select the third address signal ADR3 and the fourth address signal ADR4 from among the first to fourth address signals ADR1 to ADR4 transmitted from the application processor AP according to the second module identification signal MD-ID2, a third register RG3 set so as to output a second enable signal TE2 according to the selected third address signal ADR3, and a fourth register RG4 set so as to output a second content identification signal DIS2 according to the selected fourth address signal ADR4.

In the wearable display system according to the aspect of the present disclosure, the first content identification signal DIS1 and the second content identification signal DIS2 are selectively or simultaneously enabled, and the first enable signal TE1 and the second enable signal TE2 are selectively enabled.

In the wearable display system according to the aspect of the present disclosure, when the first enable signal TE1 and the second enable signal TE2 are selectively enabled and the first content identification signal DIS1 is selectively enabled, one of the first switch group including the termination switches of the first reception device MD1 RX and the second switch group including the termination switches of the second reception device MD2 RX is turned on, and the receiver of the first reception device MD1 RX is turned on, whereby the first display module MD1 receives the first content.

In the wearable display system according to the aspect of the present disclosure, when the first enable signal TE1 and the second enable signal TE2 are selectively enabled and the second content identification signal DIS2 is selectively enabled, one of the first switch group including the termination switches of the first reception device MD1 RX and the second switch group including the termination switches of the second reception device MD2 RX is turned on, and the receiver of the second reception device MD2 RX is turned on, whereby the second display module MD2 receives the second content.

In the wearable display system according to the aspect of the present disclosure, when the first enable signal TE1 and the second enable signal TE2 are selectively enabled and the first content identification signal DIS1 and the second content identification signal DIS2 are simultaneously enabled, one of the first switch group including the termination switches of the first reception device MD1 RX and the second switch group including the termination switches of the second reception device MD2 RX is turned on, and both the receiver of the first reception device MD1 RX and the receiver of the second reception device MD2 RX are turned on, whereby the first and second display modules MD1 and MD2 receive the third content.

A wearable display system according to another aspect of the present disclosure includes a first display module MD1, a second display module MD2, and a processor connected to the first display module MD1 and the second display module MD2 via an identical transmission lane, wherein the identical transmission lane transmits both first content for the first display module MD1 and second content for the second display module MD2.

In the wearable display system according to the other aspect of the present disclosure, the first content and the second content are alternately transmitted.

In the wearable display system according to the other aspect of the present disclosure, the identical transmission lane further transmits third content for the first display module MD1 and the second display module MD2.

As is apparent from the above description, the present disclosure has the following effects.

A wearable display system according to an aspect of the present disclosure has an effect in that the number of transmission lanes and power consumption are reduced and interface connection construction is simplified in implementing augmented reality.

The effects of the present disclosure are not limited by the above description, and various other effects are included in this specification.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A wearable display system comprising:
a head mounted structure;
a first display module mounted at one side of the head mounted structure and providing a first content and a third content;
a second display module mounted at another side of the head mounted structure and providing a second content and the third content; and
an application processor connected to a first reception device of the first display module and a second reception device of the second display module via common transmission lanes for transmitting a differential data signal and a differential clock signal,
wherein the application processor transmits both the first content and the second content via the common transmission lanes,
wherein the common transmission lanes comprise a positive data transmission lane and a negative data transmission lane for the differential data signal,
wherein the common transmission lanes further comprise a positive clock transmission lane and a negative clock transmission lane for the differential clock signal, and
wherein each of the positive data transmission lane, the negative data transmission lane, the positive clock transmission lane, and the negative clock transmission lane is connected to both the first reception device and the second reception device,
wherein the first reception device is integrated and embedded in the first display module and the second reception device is integrated and embedded in the second display module,
wherein the first reception device is configured to buffer the first content and the third content transmitted through the common transmission lanes for the first display module,
wherein the second reception device is configured to buffer the second content and the third content for the second display module,
wherein the first display module and the second display module provide the third content simultaneously,
wherein a first image according to the third content provided to the first display module and a second image according to the third content provided to the second display module are identical to each other, and
wherein the first reception device comprises:
a second receiver having a second positive data input terminal connected to the positive data transmission lane and a second negative data input terminal connected to the negative data transmission lane;
a third termination resistor and a third termination switch connected in series between the second positive data input terminal and a second node;
a fourth termination resistor and a fourth termination switch connected in series between the second negative data input terminal and the second node; and
a second termination capacitor connected between the second node and a ground voltage.

2. The wearable display system according to claim 1, wherein the second reception device comprises:
a fourth receiver having a fourth positive data input terminal connected to the positive data transmission lane and a fourth negative data input terminal connected to the negative data transmission lane;
a seventh termination resistor and a seventh termination switch connected in series between the fourth positive data input terminal and a fourth node;
an eighth termination resistor and an eighth termination switch connected in series between the fourth negative data input terminal and the fourth node; and
a fourth termination capacitor connected between the fourth node and the ground voltage.

3. The wearable display system according to claim 1, wherein the first reception device further comprises:
a first receiver having a first positive clock input terminal connected to the positive clock transmission lane and a first negative clock input terminal connected to the negative clock transmission lane;
a first termination resistor and a first termination switch connected in series between the first positive clock input terminal and a first node;
a second termination resistor and a second termination switch connected in series between the first negative clock input terminal and the first node; and
a first termination capacitor connected between the first node and a ground voltage.

4. The wearable display system according to claim 3, wherein the second reception device comprises:
a third receiver having a third positive clock input terminal connected to the positive clock transmission lane and a third negative clock input terminal connected to the negative clock transmission lane;
a fourth receiver having a fourth positive data input terminal connected to the positive data transmission lane and a fourth negative data input terminal connected to the negative data transmission lane;
a fifth termination resistor and a fifth termination switch connected in series between the third positive clock input terminal and a third node;
a sixth termination resistor and a sixth termination switch connected in series between the third negative clock input terminal and the third node;
a seventh termination resistor and a seventh termination switch connected in series between the fourth positive data input terminal and a fourth node;
an eighth termination resistor and an eighth termination switch connected in series between the fourth negative data input terminal and the fourth node;
a third termination capacitor connected between the third node and the ground voltage; and
a fourth termination capacitor connected between the fourth node and the ground voltage.

5. The wearable display system according to claim 1, wherein the application processor is further connected to the first reception device and the second reception device via common control line, and
wherein the application processor transmits a content identification signal synchronized with the first and second contents to the first reception device and the second reception device via the common control line.

6. The wearable display system according to claim 5, wherein the first reception device further comprises:
an input terminal for a first module identification signal preset to a first voltage level; and
a first operator configured to XNOR-operate the content identification signal and the first module identification signal to generate a first enable signal.

7. The wearable display system according to claim 6, wherein the second reception device further comprises:
an input terminal for a second module identification signal preset to a second voltage level different from the first voltage level; and a second operator configured to XNOR-operate the content identification signal and the second module identification signal to generate a second enable signal.

8. The wearable display system according to claim 1, wherein the application processor is further connected to the first reception device via a first control line and is further connected to the second reception device via a second control line, the application processor transmits a first content/module identification signal synchronized with the first and second content and third content to the first reception device via the first control line, the application processor transmits a second content/module identification signal synchronized with the first to third content to the second reception device via the second control line, and the third content being commonly provided to the first reception device and the second reception device.

9. The wearable display system according to claim 8, wherein the first reception device further comprises:

a first register set so as to output first register information according to an address signal when the first content/module identification signal is high voltage; and a first operator configured to AND-operate the first content/module identification signal and the first register information to generate a first enable signal.

10. The wearable display system according to claim 9, wherein the second reception device further comprises:

a second register set so as to output second register information according to the address signal when the second content/module identification signal is high voltage; and a second operator configured to AND-operate the second content/module identification signal and the second register information to generate a second enable signal.

11. The wearable display system according to claim 1, wherein the application processor controls output of registers provided in the first reception device using a first address signal and a second address signal, the application processor controls output of registers provided in the second reception device using a third address signal and a fourth address signal, and the first address signal and the third address signal being set to opposite voltage levels.

12. The wearable display system according to claim 11, wherein the first reception device further comprises:

an input terminal for a first module identification signal preset to a first voltage level;

a first address selector configured to select the first address signal and the second address signal from among the first to fourth address signals transmitted from the application processor according to the first module identification signal;

a first register set so as to output a first enable signal according to the selected first address signal; and a second register set so as to output a first content identification signal according to the selected second address signal.

13. The wearable display system according to claim 12, wherein the second reception device further comprises:

an input terminal for a second module identification signal preset to a second voltage level different from the first voltage level;

a second address selector configured to select the third address signal and the fourth address signal from among the first to fourth address signals transmitted from the application processor according to the second module identification signal;

a third register set so as to output a second enable signal according to the selected third address signal; and a fourth register set so as to output a second content identification signal according to the selected fourth address signal.

14. The wearable display system according to claim 1, wherein the first reception device comprises:

a first receive circuit configured to receive the first content and the third content transmitted on the common transmission lanes; and a first buffer configured to buffer the first content and the third content.

15. The wearable display system according to claim 14, wherein the second reception device comprises:

a second receive circuit configured to receive the second content and the third content transmitted on the common transmission lanes; and a second buffer configured to buffer the second content and the third content.

16. The wearable display system according to claim 15, wherein the first receive circuit and the second receive circuit are configured to select frames based on an address and an enable signal received from the application processor.

17. The wearable display system according to claim 1, further comprising at least one enable signal configured to control reception of the first content and the second content on the common transmission lanes at the first reception device and the second reception device.

18. The wearable display system according to claim 1, wherein the application processor includes a pre-driver circuit configured to serialize a single-ended clock and single-ended data into differential signals.

* * * * *